(12) United States Patent
Takase et al.

(10) Patent No.: US 8,588,251 B2
(45) Date of Patent: *Nov. 19, 2013

(54) PACKET TRANSFER APPARATUS

(75) Inventors: Masayuki Takase, Inagi (JP); Hideki Endo, Kokubunji (JP); Takayuki Kanno, Yokohama (JP); Akihiko Tanaka, Yokohama (JP); Yoshihiro Ashi, Yokohama (JP); Nobuyuki Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 367 days.

This patent is subject to a terminal disclaimer.

(21) Appl. No.: 12/929,100

(22) Filed: Dec. 30, 2010

(65) Prior Publication Data

US 2011/0096794 A1   Apr. 28, 2011

Related U.S. Application Data

(63) Continuation of application No. 12/073,951, filed on Mar. 12, 2008, now Pat. No. 7,876,778.

(30) Foreign Application Priority Data

Jul. 10, 2007   (JP) ................................ 2007-180987

(51) Int. Cl.
  *H04J 3/24*   (2006.01)
(52) U.S. Cl.
  USPC .......................................... 370/466; 370/401
(58) Field of Classification Search
  USPC .......... 370/401, 464, 465, 466, 467, 469, 474
  See application file for complete search history.

(56) References Cited

U.S. PATENT DOCUMENTS

| 2003/0219023 A1 | 11/2003 | Miyata et al. |
| 2005/0008020 A1 | 1/2005 | Ashwood-Smith et al. |
| 2005/0249205 A1 | 11/2005 | O'Brien et al. |

FOREIGN PATENT DOCUMENTS

| JP | 2001-189732 | | 7/2001 |
| JP | 2001-320426 | A | 11/2001 |
| JP | 2002-509411 | | 3/2002 |
| JP | 2002-344534 | A | 11/2002 |
| JP | 2004-260238 | | 9/2004 |
| JP | 2006-174508 | A | 6/2006 |

OTHER PUBLICATIONS

Office Action from the Japanese Patent Office, dated Jul. 7, 2009, in Japanese.
English Translation of Japanese Publication No. JP 2001-189732 A, previously submitted to the USPTO on Dec. 30, 2010.
Japanese Office Action dated Jun. 19, 2012 (English Translation only).

*Primary Examiner* — Dady Chery
(74) *Attorney, Agent, or Firm* — Crowell & Moring LLP

(57) ABSTRACT

A packet transfer apparatus connects two networks of different protocols. The packet transfer apparatus, connected to a first communication network and a second communication network, performs the steps of: storing first destination correspondence information; receiving a packet of the first communication protocol; based on the first destination correspondence information, determining destination information of a packet of the second communication protocol corresponding to destination information of the received packet of the first communication protocol; generating the header of the packet of the second communication protocol, based on the determined destination information of the packet of the second communication protocol; converting the received one or more packets of the first communication protocol into one or more packets of the third communication protocol; and adding the generated header of the packet of the second communication protocol to the packets of the third communication protocol.

6 Claims, 17 Drawing Sheets

FIG. 4

| VPI | VCI | CONNECTION ID | UPPER LAYER COMMUNI-CATION PROTOCOL TYPE |
|---|---|---|---|
| 10 | 11 | 100 | AAL5 |
| 30 | 33 | 300 | AAL1 |
| 50 | 55 | 500 | ATM BEARER |
| (n) | (n) | (n) | (n) |

43
ATM CONNECTION TABLE

FIG. 5

| CONNECTION ID | TUNNEL LABEL VALUE | VC LABEL VALUE |
|---|---|---|
| 100 | 1000 | 100 |
| 300 | 3000 | 300 |
| 500 | 5000 | 500 |
| (n) | (n) | (n) |

47
MPLS HEADER CONVERSION TABLE

FIG. 6

| TUNNEL LABEL VALUE (71) | VC LABEL VALUE (72) | CONNECTION ID (73) | UPPER LAYER COMMUNICATION PROTOCOL TYPE (74) |
|---|---|---|---|
| 2000 | 200 | 200 | AAL5 |
| 4000 | 400 | 400 | AAL1 |
| 6000 | 600 | 600 | ATM BEARER |
| (n) | (n) | (n) | (n) |

53 MPLS CONNECTION TABLE

FIG. 7

| CONNECTION ID (75) | VPI (76) | VCI (77) |
|---|---|---|
| 200 | 10 | 11 |
| 400 | 30 | 33 |
| 600 | 50 | 55 |
| (n) | (n) | (n) |

57 ATM HEADER CONVERSION TABLE

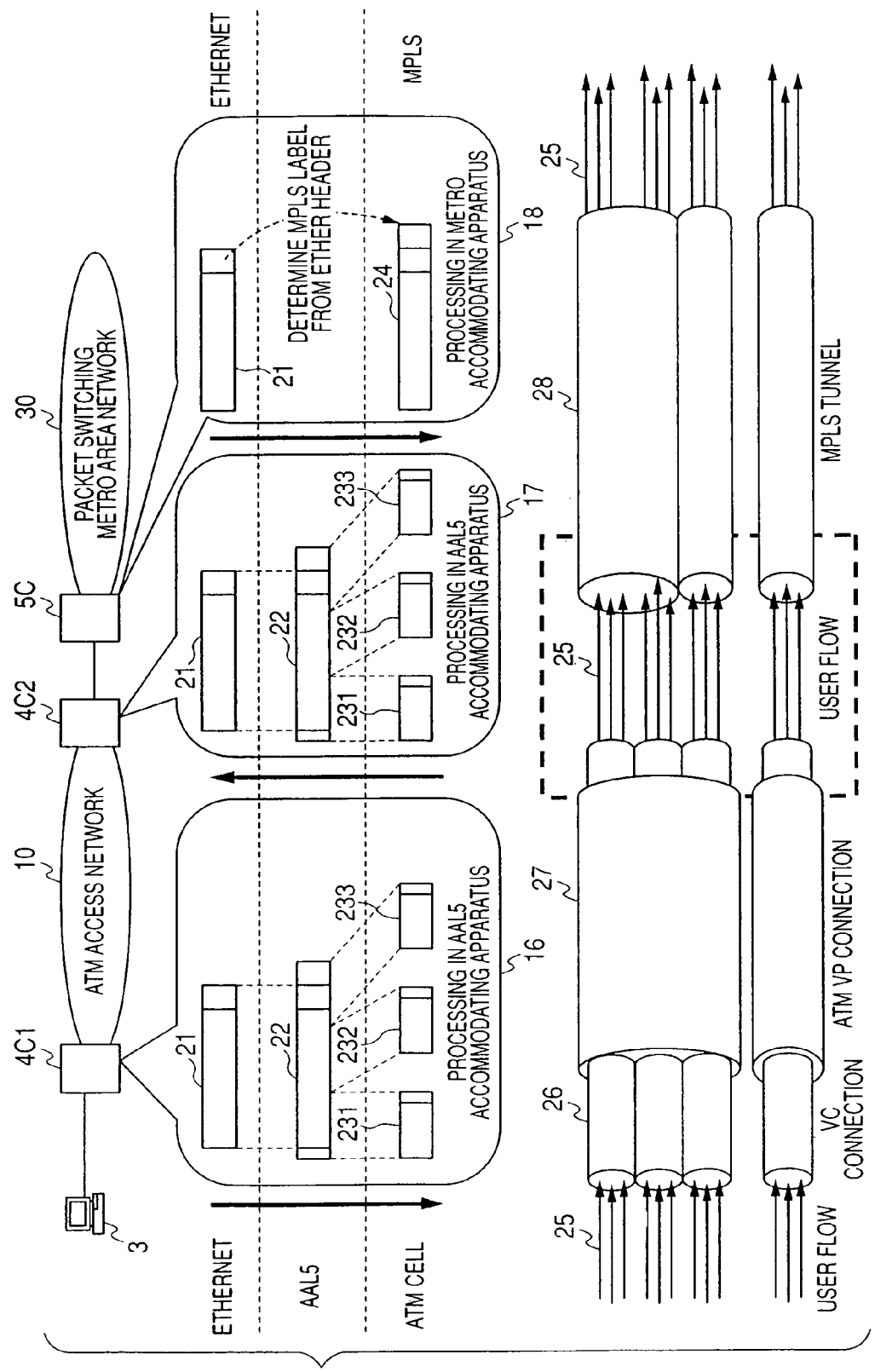

PACKET TRANSFER APPARATUS

CLAIM OF PRIORITY

This application is a Continuation of U.S. patent application Ser. No. 12/073,951 filed Mar. 12, 2008 now U.S. Pat. No. 7,876,778. The present application claims priority from U.S. patent application Ser. No. 12/073,951 filed Mar. 12, 2008, which claims priority from Japanese Application No. JP The present application claims priority from Japanese application JP 2007-180987 filed on Jul. 10, 2007, the content of which is hereby incorporated by reference into this application.

FIELD OF THE INVENTION

The present invention relates to a packet transfer apparatus connected to a first communication network and a second communication network, and more particularly to technology for converting packet protocols.

BACKGROUND OF THE INVENTION

ATM (Asynchronous Transfer Mode) that performs data communication by using fixed-length packets (or fixed-length frames) is widely used from an access network of a telecommunications carrier's network to a metro area network. ATM is a communication technology developed to handle various information items such as data, voice, and moving images over one network. In ATM, a fixed-length packet is referred to as an ATM cell.

ATM has standards such as AAL1 and AAL5. AAL1 is a communication standard of connection-type and fixed bit rate. AAL1 is primarily used for voice communication such as TDM. AAL5 is a communication standard of connection-less type and variable bit rate. AAL5 is used for data communication of Ethernet (registered trademark, hereinafter the same) and the like.

A method of for encapsulating and decapsulating data is different for AAL1 and AAL5. Therefore, in an ATM access network, an access accommodating apparatus that houses a user terminal is required for each of user's applications. For example, the ATM access network requires an ATM accommodating apparatus, an AAL1 accommodating apparatus, and an AAL5 accommodating apparatus.

In JP-A-2004-260238, a packet transfer apparatus that connects LAN and ATM is disclosed.

SUMMARY OF THE INVENTION

Although ATM includes high-quality communication functions such as a maintenance function and a band control function, communication devices are expensive. Therefore, in recent years, a packet switching protocol that uses variable-length packets for data communication has gone mainstream. Accordingly, there is a demand for technology for replacing a metro area network to which ATM is applied (ATM metro area network) by a metro area network to which the packet switching protocol is applied (packet switching metro area network). However, there has been a problem in that a packet transfer apparatus that connects an ATM access network and the packet switching metro area network does not exist.

The present invention has been made in view of the aforementioned problem, and its object is to offer a packet transfer apparatus that connects two networks of different protocols.

A typical embodiment of the present invention is a packet transfer apparatus connected to a first communication network over which data communication is performed with a first communication protocol, and a second communication network over which data communication is performed with a second communication protocol. The packet transfer apparatus stores first destination correspondence information containing the correspondence between the destination information of packets of the first communication protocol and the destination information of packets of the second communication protocol for transferring packets of the first communication protocol to the second communication network. It receives a packet of the first communication protocol generated by conversion of a packet of a third communication protocol from the first communication network, and based on the first destination correspondence information, determines destination information of a packet of the second communication protocol corresponding to destination information of the received packet of the first communication protocol. Furthermore, the packet transfer apparatus generates the header of the packet of the second communication protocol, based on the determined destination information of the packet of the second communication protocol, converts the received one or more packets of the first communication protocol into one or more packets of the third communication protocol, and adds the generated header of the packet of the second communication protocol to the packets of the third communication protocol generated by the conversion. Thereby, the packet transfer apparatus converts the packets generated by the conversion into the packet of the second communication protocol, and transmits the packet of the second communication protocol generated by the conversion to the second communication network.

According to the typical embodiment of the present invention, the packet transfer apparatus can connect two networks of different protocols.

BRIEF DESCRIPTION OF THE DRAWINGS

FIG. 4 is a drawing showing the structure of an ATM connection table stored in a packet transfer apparatus of an embodiment of the present invention;

FIG. 5 is a drawing showing the structure of an MPLS header conversion table stored in a packet transfer apparatus of an embodiment of the present invention;

FIG. 6 is a drawing showing the structure of an MPLS connection table stored in a packet transfer apparatus of an embodiment of the present invention;

FIG. 7 is a drawing showing the structure of an ATM header conversion table stored in a packet transfer apparatus of an embodiment of the present invention;

FIG. 20 is an explanatory drawing of communication concerning Ethernet frame in a telecommunications carrier's network constructed as shown in FIG. 2.

DETAILED DESCRIPTION OF THE PREFERRED EMBODIMENTS

Hereinafter, preferred embodiments of the present invention will be described with reference to the accompanying drawings.

This embodiment assumes that a first communication protocol is ATM (Asynchronous Transfer Mode), and a second communication protocol is MPLS. However, the first communication protocol may not be ATM but may be any communication protocol of connection type. The second communication protocol may not be MPLS but may be any communication protocol of connection type. However, the second communication protocol is preferably a packet switching protocol that allows connection-oriented bus setting and high-quality communication. Packets in the claims include cells and frames.

Figure 1:
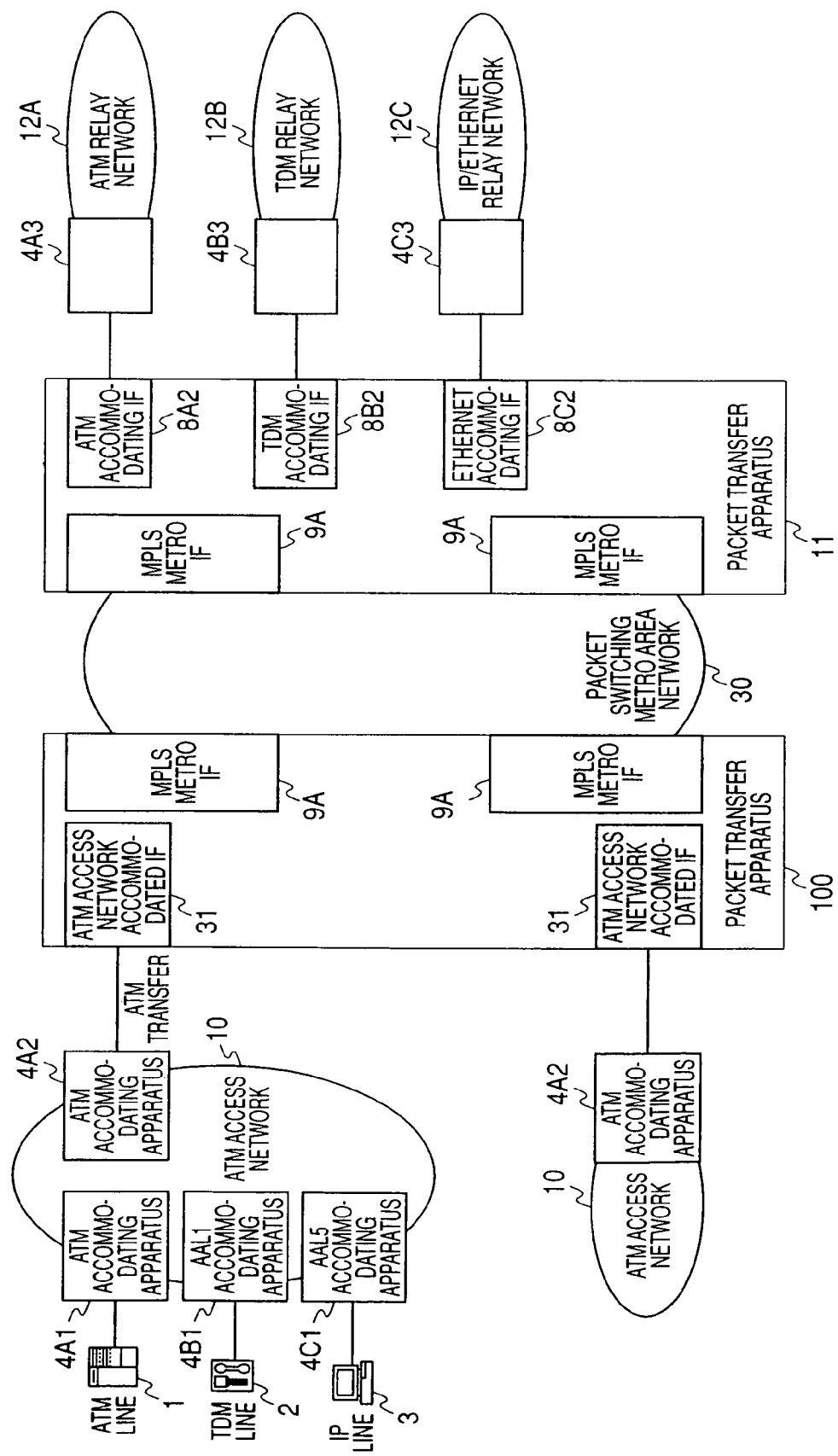
FIG. 1 is a block diagram of the construction of a telecommunications carrier's network of an embodiment of the present invention.

FIG. 1 is a block diagram of the construction of a telecommunications carrier's network of an embodiment of the present invention.

The telecommunications carrier's network includes user terminals 1, 2, and 3, ATM access network 10, packet transfer apparatus 100, packet switching metro area network 30, packet transfer apparatus 11, ATM relay network 12A, and TDM relay network 12B, and IP/Ethernet relay network 12C.

The ATM access network 10 includes ATM accommodating apparatuses 4A1 and 4A2, AAL1 accommodating apparatus 4B1, and AAL5 accommodating apparatus 4C1.

The ATM accommodating apparatus 4A1 is a device that houses a user terminal 1. The user terminal 1 transmits and receives ATM cells. The ATM accommodating apparatus 4A2 is a device connected to the packet transfer apparatus 100.

The ATM accommodating apparatuses 4A1 and 4A2 receive an ATM cell. Then, the ATM accommodating apparatuses 4A1 and 4A2 determine a transfer destination of the ATM cell, based on the ATM header of the received ATM cell.

Next, the ATM accommodating apparatuses 4A1 and 4A2 transfer the received ATM cell to the determined transfer destination.

The AAL1 accommodating apparatus 4B1 is a device that houses a user terminal 2. The user terminal 2 performs TDM communication such as a phone or PBX.

The AAL1 accommodating apparatus 4B1 receives a TDM frame from the user terminal 2. Next, the AAL1 accommodating apparatus 4B1 transforms the received TDM frame into a capsule in AAL1 format. Thereby, the AAL1 accommodating apparatus 4B1 converts the received TDM frame into an AAL1 frame.

Next, the AAL1 accommodating apparatus 4B1 splits the AAL1 frame generated by the conversion into ATM cell size, and adds an ATM header. Thereby, the AAL1 accommodating apparatus 4B1 converts the AAL1 frame into an ATM cell. AAL1 accommodating apparatus 4B1 transmits the ATM cell generated by the conversion to the ATM access network 10.

The AAL1 accommodating apparatus 4B1 receives an ATM cell from the ATM access network 10. Then, AAL1 accommodating apparatus 4B1 converts one or more received ATM cells into an AAL1 frame. Next, the AAL1 accommodating apparatus 4B1 decapsulates the AAL1 frame generated by the conversion. Thereby, the AAL1 accommodating apparatus 4B1 converts the AAL1 frame into a TDM frame. The AAL1 accommodating apparatus 4B1 transmits the TDM frame generated by the conversion to the user terminal 2.

The AAL5 accommodating apparatus 4C1 is a device that houses a user terminal 3. The user terminal 3 performs Ethernet communication.

The AAL5 accommodating apparatus 4C1 receives an Ethernet frame from the user terminal 3. Next, the AAL5 accommodating apparatus 4C1 decapsulates the received Ethernet frame in AAL5 format. Thereby, the AAL5 accommodating apparatus 4C1 converts the received Ethernet frame into an AAL5 frame.

Next, the AAL5 accommodating apparatus 4C1 splits the AAL5 frame generated by the conversion into ATM cell size, and adds an ATM header. Thereby, the AAL5 accommodating apparatus 4C1 converts the AAL5 frame into an ATM cell. The AAL5 accommodating apparatus 4C1 transmits the ATM cell generated by the conversion to the ATM access network 10.

The AAL5 accommodating apparatus 4C1 receives an ATM cell from the ATM access network 10. Then, AAL5 accommodating apparatus 4C1 converts one or more received ATM cells into an AAL5 frame. Next, the AAL5 accommodating apparatus 4C1 decapsulates the AAL5 frame generated by the conversion. Thereby, the AAL5 accommodating apparatus 4C1 converts the AAL5 frame into an Ethernet frame. The AAL5 accommodating apparatus 4C1 transmits the Ethernet frame generated by the conversion to the user terminal 2.

The packet transfer apparatus 100 connects the packet switching metro area network 30 and the ATM access network 10. The packet transfer apparatus 100 will be detailed in FIG. 3.

The packet transfer apparatus 11 connects the packet switching metro area network 30, the ATM relay network 12A, the TDM relay network 12B, and the IP/Ethernet relay network 12C.

In the packet switching metro area network 30, MPLS packets are used for data communication.

In the ATM relay network 12A, ATM cells are used for data communication. The ATM relay network 12A includes an ATM accommodating apparatus 4A3. The ATM accommodating apparatus 4A3 has the same functions as the ATM accommodating apparatuses 4A1 and 4A2.

In the TDM relay network 12B, TDM frames are used for data communication. The TDM relay network 12B includes an AAL1 accommodating apparatus 4B3. The AAL1 accommodating apparatus 4B3 has the same functions as the AAL1 accommodating apparatus 4B1.

In the IP/Ethernet relay network 12C, Ethernet frames are used for data communication. The IP/Ethernet relay network 12C includes an AAL5 accommodating apparatus 4C3. The AAL5 accommodating apparatus 4C3 has the same functions as the AAL5 accommodating apparatus 4C1.

The packet transfer apparatus 11 includes an MPLS metro interface (IF) 9A, an ATM accommodating IF 8A2, a TDM accommodating IF 8B2, and an Ethernet accommodating IF 8C2.

The MPLS metro IF 9A is an interface connected with the packet switching metro area network 30.

The ATM accommodating IF 8A2 is an interface connected to the ATM relay network 12A. The ATM accommodating IF 8A2 mutually converts MPLS packets and ATM cells.

The TDM accommodating IF 8B2 is an interface connected to the TDM relay network 12B. The TDM accommodating IF 8B2 mutually converts MPLS packets and TDM frames.

The Ethernet accommodating IF 8C2 is an interface connected to the IP/Ethernet relay network 12C. The Ethernet accommodating IF 8C2 mutually converts MPLS packets and Ethernet frames.

The following describes the telecommunications carrier's network when the ATM metro area network is replaced by the packet switching metro area network, without providing the packet transfer apparatus 100 of this embodiment.

Figure 2:
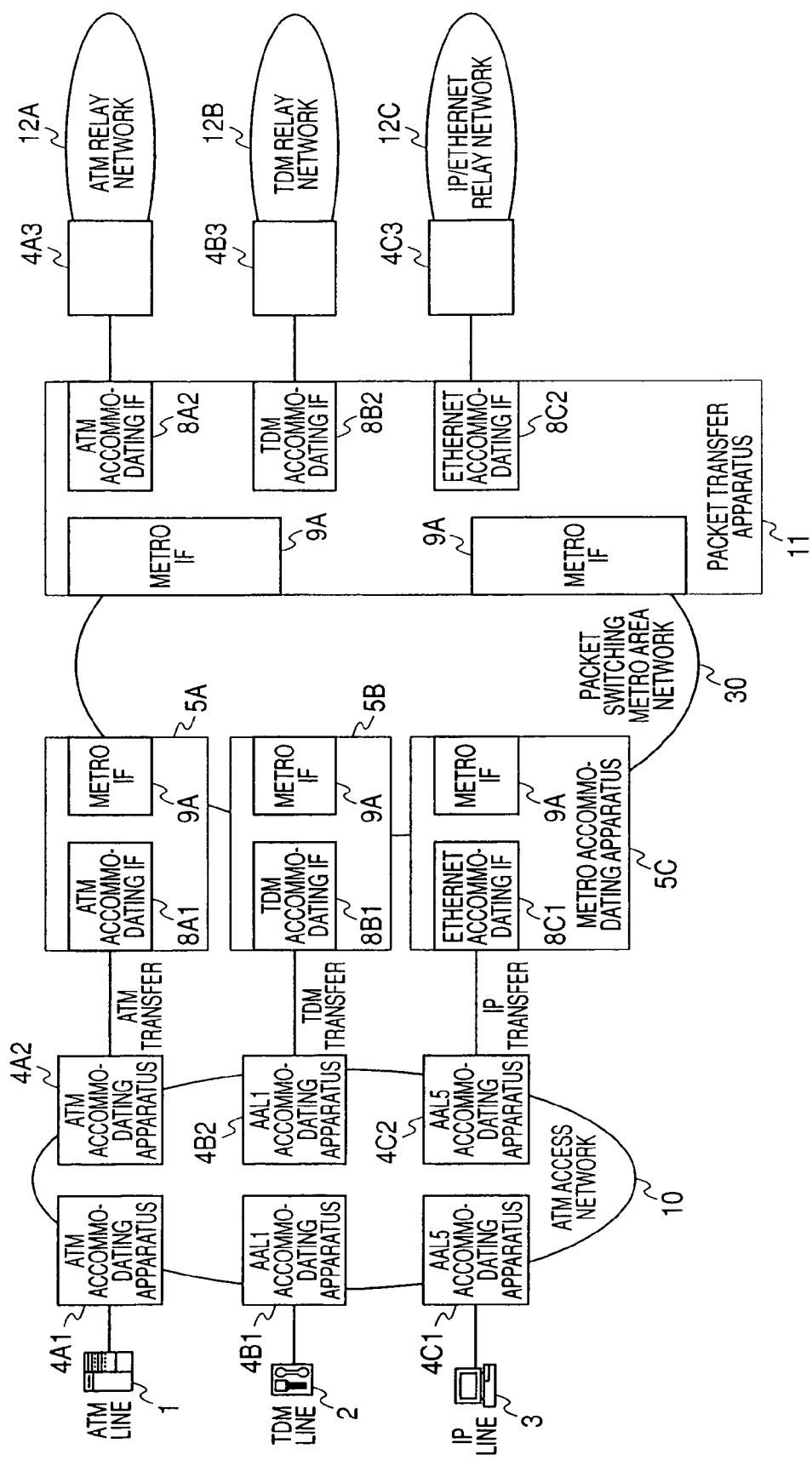
FIG. 2 is a block diagram of the construction of a telecommunications carrier's network that does not include a packet transfer apparatus.

FIG. 2 is a block diagram showing the construction of the telecommunications carrier's network when the packet transfer apparatus 100 is not provided.

The telecommunications carrier's network not including the packet transfer apparatus 100 of this embodiment includes the metro accommodating apparatuses 5A, 5B, and 5C in place of the packet transfer apparatus 100. Therefore, the ATM access network 10 of the telecommunications carrier's network not including the packet transfer apparatus 100 further must include an AAL1 accommodating apparatus 4B2 and an AAL5 accommodating apparatus 4C2. Other components of the telecommunications carrier's network not including the packet transfer apparatus 100 are the same as the components (FIG. 1) of the telecommunications carrier's network of this embodiment. The same components are identified by the same reference numerals; descriptions of them are not omitted.

The metro accommodating apparatuses 5A, 5B, and 5 C connect the packet switching metro area network 30 and the ATM access network 10.

The metro accommodating apparatus 5A includes an ATM accommodating IF 8A1 and an MPLS metro IF 9A. The ATM accommodating IF 8A1 is an interface connected to the ATM accommodating apparatus 4A2. The ATM accommodating IF 8A1 mutually converts MPLS packets and ATM cells.

The MPLS metro IF 9A is an interface connected to the packet switching metro area network 30.

The metro accommodating apparatus 5B includes a TDM accommodating IF 8B1 and an MPLS metro IF 9A. The TDM accommodating IF 8B1 is an interface connected to AAL1 accommodating apparatus 4B2. The TDM accommodating IF 8B1 mutually converts MPLS packets and TDM frames.

The metro accommodating apparatus 5C includes an Ethernet accommodating IF 8C1 and the MPLS metro IF 9A. The Ethernet accommodating IF 8C1 is an interface connected to the AAL5 accommodating apparatus 4C2. The Ethernet accommodating IF 8C1 mutually converts MPLS packets and Ethernet frames.

The AAL1 accommodating apparatus 4B2 is a device connected to the metro accommodating apparatus 5B. The AAL1 accommodating apparatus 4B2 has the same functions as the AAL1 accommodating apparatus 4B1.

The AAL1 accommodating apparatus 4B2 receives a TDM frame from the metro accommodating apparatus 5B. Next, the AAL1 accommodating apparatus 4B2 encapsulates the received TDM frame in AAL1 format. Thereby, the AAL1 accommodating apparatus 4B2 converts the received TDM frame into the AAL1 frame.

Next, the AAL1 accommodating apparatus 4B2 splits the AAL1 frame generated by conversion into ATM cell size, and adds an ATM header. Thereby, the AAL1 accommodating apparatus 4B2 converts the AAL1 frame into an ATM cell. The AAL1 accommodating apparatus 4B2 transmits the ATM cell generated by the conversion to the ATM access network 10.

The AAL1 accommodating apparatus 4B2 receives an ATM cell from the ATM access network 10. Then, AAL1 accommodating apparatus 4B2 converts one or more received ATM cells into the AAL1 frame. Next, the AAL1 accommodating apparatus 4B2 decapsulates the AAL1 frame generated by the conversion. Thereby, the AAL1 accommodating apparatus 4B2 converts the AAL1 frame into a TDM frame. The AAL1 accommodating apparatus 4B2 transmits the TDM frame generated by the conversion to the metro accommodating apparatus 5B.

The AAL5 accommodating apparatus 4C2 is a device connected to the metro accommodating apparatus 5C. The AAL5 accommodating apparatus 4C2 has the same functions as the AAL5 accommodating apparatus 4C1.

The AAL5 accommodating apparatus 4C2 receives an Ethernet frame from the metro accommodating apparatus 5C. Next, the AAL5 accommodating apparatus 4C2 encapsulates the received Ethernet frame in AAL5 format. Thereby, the AAL5 accommodating apparatus 4C2 converts the received Ethernet frame into an AAL5 frame.

Next, the AAL5 accommodating apparatus 4C2 splits the AAL5 frame generated by the conversion into ATM cell size, and adds an ATM header. Thereby, the AAL5 accommodating apparatus 4C2 converts the AAL5 frame into an ATM cell. The AAL5 accommodating apparatus 4C2 transmits the ATM cell generated by the conversion to the ATM access network 10.

The AAL5 accommodating apparatus 4C2 receives an ATM cell from the ATM access network 10. Then, the AAL5 accommodating apparatus 4C2 converts one or more received ATM cells into an AAL5 frame. Next, the AAL5 accommodating apparatus 4C2 decapsulates the AAL5 frame generated by the conversion. Thereby, the AAL5 accommodating apparatus 4C2 converts the AAL5 frame into an Ethernet frame. The AAL5 accommodating apparatus 4C2 transmits an Ethernet frame generated by the conversion to the metro accommodating apparatus 5C.

Figure 3:
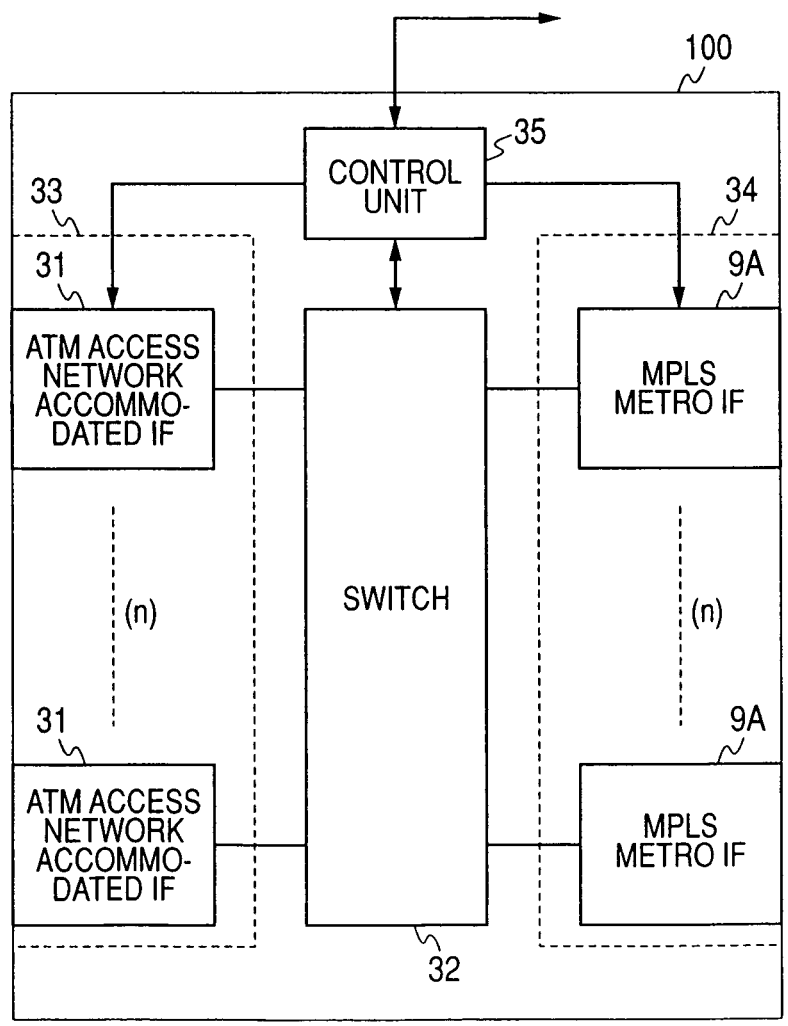
FIG. 3 is a block diagram of the construction of a packet transfer apparatus of an embodiment of the present invention.

FIG. 3 is a block diagram showing the construction of the packet transfer apparatus 100 of an embodiment of the present invention.

The packet transfer apparatus 100 includes tributary IF accommodating slot 33, ATM access network accommodated IF 31, up-link IF accommodating slot 34, MPLS metro IF 9A, switch 32, and control unit 35.

The tributary IF accommodating slot 33 houses an interface connected to the ATM access network 10, the ATM relay network 12A, the TDM relay network 12B, or the IP/Ethernet relay network 12C. For example, the tributary IF accommodating slot 33 houses one or more ATM access network accommodated IFs 31. The tributary IF accommodating slot 33 may house ATM accommodating IF, TDM accommodating IF, Ethernet accommodating IF, or the like.

The ATM access network accommodated IF 31 is an interface connected to the ATM access network 10. The ATM access network accommodated IF 31 stores various tables including ATM connection table 43 (FIG. 4), MPLS header conversion table 47 (FIG. 5), MPLS connection table 53 (FIG. 6), ATM header conversion table 57 (FIG. 7). The ATM access network accommodated IF 31 will be detailed in FIG. 8.

The ATM accommodating IF is an interface connected to the ATM relay network 12A. The ATM accommodating IF mutually converts MPLS packets and ATM cells.

The TDM accommodating IF is an interface connected to the TDM relay network 12B. Moreover, it mutually converts MPLS packets and TDM frames.

The Ethernet accommodating IF is an interface connected to the IP/Ethernet relay network 12C. Moreover, it mutually converts MPLS packets and Ethernet frames.

The up-link IF accommodating slot 34 houses one or more MPLS metro IFs 9A. The MPLS metro IF 9A is an interface connected to the packet switching metro area network 30.

The switch 32 controls transfer of MPLS packets between IFs including the ATM access network accommodated IF 31, the MPLS metro IF 9A, and the like.

The control unit 35 controls processing of the ATM access network accommodated IF 31, the MPLS metro IF 9A, and the switch 32. Moreover, it receives information from an external management terminal (not shown in the drawing), and based on the received information, updates various tables stored in the ATM access network accommodated IF 31.

FIG. 4 is a block diagram of the ATM connection table 43 stored in the packet transfer apparatus 100 of the embodiment of the present invention.

The ATM connection table 43 includes VPI (Virtual Path Identifier) 61, VCI (Virtual Channel Identifier) 62, connection ID 63, and upper layer communication protocol type 64.

The VPI 61 and the VCI 62 are identifiers showing the destination of an ATM cell received by the ATM access network accommodated IF 31.

The connection ID 63 is a unique identifier of connection corresponding to an ATM cell pertinent to a relevant record. The connection ID 63 is added to an ATM cell pertinent to a relevant record. The upper layer communication protocol type 64 shows the type of a communication protocol of an upper layer of an ATM cell pertinent to a relevant record. In this embodiment, the upper communication protocol 64 shows any of ATM bearer, AAL1, or AAL5.

FIG. 5 is a drawing showing the structure of an MPLS header conversion table 47 stored in the packet transfer apparatus 100 of an embodiment of the present invention.

The MPLS header conversion table 47 includes connection IDs 65, tunnel label values 66, and VC label values 67.

The connection ID 65 is a unique identifier of connection. The tunnel label value 66 and the VC label value 67 are an identifier showing the destination of an MPLS packet corresponding to connection identified by connection ID 65 of a relevant record.

Although an MPLS packet of this embodiment has two MPLS labels, tunnel label and VC label, it may have any number of MPLS labels.

FIG. 6 is a drawing showing the structure of the MPLS connection table 53 stored in the packet transfer apparatus 100 of an embodiment of the present invention.

The MPLS connection table 53 includes tunnel label value 71, VC label value 72, connection ID 73, and upper layer communication protocol type 74.

The tunnel label value 71 and the VC label value 72 are an identifier showing the destination of an MPLS packet received by the ATM access network accommodated IF 31.

The connection ID 73 is a unique identifier of connection corresponding to an MPLS packet pertinent to a relevant record. The connection ID 73 is added to an MPLS packet pertinent to a relevant record. The upper layer communication protocol type 74 shows the type of a communication protocol of an upper layer of an ATM cell generated from an MPLS packet pertinent to a relevant record.

FIG. 7 is a drawing showing the structure of an ATM header conversion table 57 stored in the packet transfer apparatus 100 of an embodiment of the present invention.

The ATM header conversion table 57 includes connection ID 75, VPI 76, and VCI 77.

The connection ID 75 is a unique identifier of connection. VPI 76 and VCI 77 are identifiers showing the destination of an ATM cell corresponding to connection identified by the connection ID 75 of a relevant record.

Figure 8:
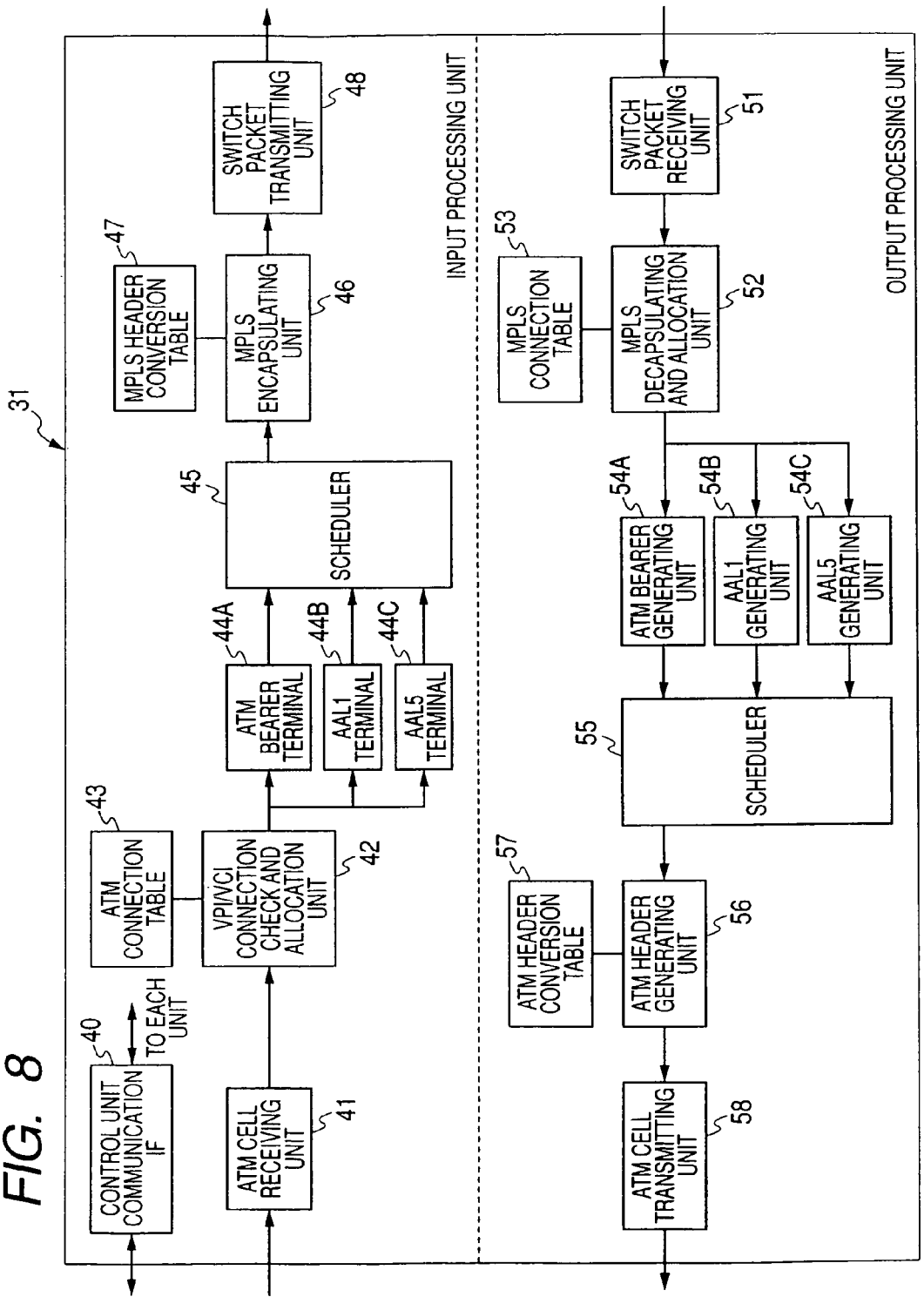
FIG. 8 is a block diagram of a functional construction of an ATM access network accommodated IF provided in a packet transfer apparatus of an embodiment of the present invention.

FIG. 8 is a block diagram of a functional construction of the ATM access network accommodated IF 31 provided in the packet transfer apparatus 100 of an embodiment of the present invention.

The ATM access network accommodated IF 31 includes an input processing unit, an output processing unit, and a control unit communication IF 40.

The control unit communication IF 40 is an interface for communicating with the control unit 35. For example, the control unit communication IF 40 transmits commands received from the control unit 35 to each processing unit.

On receiving an ATM cell from the ATM access network 10, the input processing unit converts the received ATM cell into an MPLS packet. The input processing unit transmits the MPLS packet generated by the conversion to the switch 32.

The input processing unit includes ATM cell receiving unit 41, VPI (Virtual Path Identifier)/VCI (Virtual Channel Identifier) connection check and allocation unit 42, ATM connection table 43, ATM bearer terminal 44A, and AAL1 terminal 44B, AAL5 terminal 44C, scheduler 45, MPLS encapsulating unit 46, MPLS header conversion table 47, and switch packet transmitting unit 48.

The ATM cell receiving unit 41 receives the ATM cell from the ATM access network 10. Then, it determines whether the received ATM cell is normal, based on the ATM header of the received ATM cell. When the ATM cell is abnormal, it discards the received ATM cell. On the other hand, when the ATM cell is normal, it transmits the received ATM cell to the VPI/VCI connection check and allocation unit 42.

The VPI/VCI connection check and allocation unit 42 receives an ATM cell from ATM cell receiving unit 41. Then, it consults the ATM connection table 43 to determine an upper layer communication protocol type and connection of the received ATM cell. Processing of the VPI/VCI connection check and allocation unit 42 will be detailed in FIG. 9.

The ATM bearer terminal 44A receives an ATM cell added with a connection ID from the VPI/VCI connection check and allocation unit 42. Then, it temporarily stores the received ATM cell in a cell buffer. It transmits a read request to the scheduler 45.

On receiving a read permission notice from the scheduler 45, the ATM bearer terminal 44A transmits one ATM cell stored in the cell buffer to the scheduler 45.

The AAL1 terminal 44B receives an ATM cell added with a connection ID from the VPI/VCI connection check and allocation unit 42. Then, it classifies the received ATM cell by connection ID added to the received ATM cell.

Next, the AAL1 terminal 44B converts the classified ATM cell into a TDM frame.

Specifically, the AAL1 terminal 44B converts one or more ATM cells added with an identical session ID into an AAL1 frame. Next, it decapsulates the AAL1 frame generated by the conversion. Thereby, the AAL1 terminal 44B converts the AAL1 frame into a TDM frame.

Next, the AAL1 terminal 44B stores the TDM frame generated by the conversion in a frame buffer. It transmits a read request to the scheduler 45.

On receiving a read permission notice from the scheduler 45, the AAL1 terminal 44B, to the start of one TDM frame stored in the frame buffer, adds a connection ID added to an ATM cell having been converted into the TDM frame. Then, it transmits the TDM frame added with the connection ID to the scheduler 45.

The AAL5 terminal 44C receives an ATM cell added with a connection ID from the VPI/VCI connection check and allocation unit 42. Then, it classifies the received ATM cell by connection ID added to the received ATM cell.

Next, the AAL5 terminal 44C converts the classified ATM cell into an Ethernet frame.

Specifically, the AAL5 terminal 44C converts one or more ATM cells added with an identical session ID into an AAL5 frame. The ATM header of an ATM cell contains bits indicating a relative position of the ATM cell in an AAL5 frame. Accordingly, the AAL5 terminal 44C refers to the bits contained in the ATM header of an ATM cell to convert one or more ATM cells into an AAL5 frame.

Next, the AAL5 terminal 44C decapsulates the AAL5 frame generated by the conversion. Thereby, the AAL5 terminal 44C converts the AAL5 frame into an Ethernet frame.

Next, the AAL5 terminal 44C stores the Ethernet frame generated by the conversion in the frame buffer. The AAL5 terminal 44c transmits a read request to the scheduler 45.

On receiving a read permission notice from the scheduler 45, the AAL5 terminal 44C, to the start of one Ethernet frame stored in the frame buffer, adds a connection ID added to an ATM cell having been converted into the Ethernet frame. Then, it transmits the TDM frame added with the connection ID to the scheduler 45.

The scheduler 45 receives a read request from at least one of the ATM bearer terminal 44A, the AAL1 terminal 44B, and the AAL5 terminal 44C. Then, the scheduler 45 determines a terminal permitted to read data from among the ATM bearer terminal 44A, the AAL1 terminal 44B, and the AAL5 terminal 44C that have transmitted the received read request. The scheduler 45 transmits a read permission notice to the determined terminal.

At this time, the scheduler 45 preferentially determines the AAL1 terminal 44B as a terminal permitted to read data. This is because AAL1 frames are used in communication that requires real time capability such as voice communication. Thereby, one ATM access network accommodated IF 31 can support three types of upper communication protocols the ATM bearer, AAL1, and AAL5 while minimizing processing delay of AAL1 frames.

After that, the scheduler 45 receives an ATM cell, TDM frame, or Ethernet frame from the terminal to which the read permission notice is transmitted. The scheduler 45 transmits the received ATM cell, TDM frame or Ethernet frame to the MPLS encapsulating unit 46.

The MPLS encapsulating unit 46 receives an ATM cell, TDM frame, or Ethernet frame from the scheduler 45. Then, it consults the MPLS header conversion table 47 to determine an MPLS label. It encapsulates the received ATM cell, TDM frame or Ethernet frame with the determined MPLS label. Standard of encapsulating ATM cells with MPLS label, standard of encapsulating TDM frames with MPLS label, and standard of encapsulating Ethernet frames with MPLS label are stipulated by standardization groups.

Thereby, the MPLS encapsulating unit 46 converts the received ATM cell, TDM frame, or Ethernet frame into an MPLS packet. Processing of the MPLS encapsulating unit 46 will be detailed in FIG. 10.

The switch packet transmitting unit 48 receives the MPLS packet from the MPLS encapsulating unit 46. Then, it transfers the received MPLS packet to the switch 32.

On receiving the MPLS packet from the switch 32, the output processing unit converts the received MPLS packet into an ATM cell. Then, it transmits an MPLS packet generated by the conversion to the ATM access network 10.

The output processing unit includes a switch packet receiving unit 51, an MPLS decapsulating and allocation unit 52, an MPLS connection table 53, an ATM bearer generating unit 54A, an AAL1 generating unit 54B, an AAL5 generating unit 54C, a scheduler 55, an ATM header generating unit 56, an ATM header conversion table 57, and an ATM cell transmitting unit 58.

The switch packet receiving unit 51 receives the MPLS packet from the switch. Then, it determines whether the received MPLS packet is normal. When the MPLS packet abnormal, it discards the received MPLS packet. On the other hand, when the MPLS packet is normal, it transmits the received MPLS packet to the MPLS decapsulating and allocation unit 52.

The MPLS decapsulating and allocation unit 52 receives the MPLS packet from the switch packet receiving unit 51. Then, it consults the MPLS connection table 53 to determine an upper layer communication protocol type and connection of the received MPLS packet. Processing of the MPLS decapsulating and allocation unit 52 will be detailed in FIG. 13.

The ATM bearer generating unit 54A receives the payload of an ATM cell added with a connection ID from the MPLS decapsulating and allocation unit 52. Then, it temporarily stores the payload of the received ATM cell in the cell buffer. It transmits a read request to the scheduler 55.

On receiving a read permission notice from the scheduler 55, the ATM bearer generating unit 54A transmits the payload of one ATM cell stored in the cell buffer to the scheduler 55.

The AAL1 generating unit 54B receives a TDM frame added with a connection ID from the MPLS decapsulating and allocation unit 52. Then, it removes the connection ID from the received TDM frame. Next, it encapsulates the TDM frame with the connection ID removed in AAL1 format. Thereby, it converts the TDM frame with the connection ID removed into an AAL1 frame.

Next, the AAL1 generating unit 54B splits the AAL1 frame generated by the conversion into the size of the payload of ATM cell. When the size of the split data is less than the payload size of ATM cell, the AAL1 generating unit 54B performs padding processing.

Thereby, the AAL1 generating unit 54B converts the AAL1 frame into the payload of ATM cell. Next, it temporarily stores the payload of ATM cell generated by the conversion in the cell buffer. It transmits a read request to the scheduler 55.

On receiving a read permission notice from the scheduler 55, the AAL1 generating unit 54B, to the start of the payload of one ATM cell stored in the cell buffer, adds a connection ID removed from the TDM frame converted into the payload of the ATM cell. It transmits the payload of the ATM cell added with a connection ID to the scheduler 55.

The AAL5 generating unit 54C receives an Ethernet frame added with a connection ID from the MPLS decapsulating and allocation unit 52. Then, it removes the connection ID from the received Ethernet frame. Next, it encapsulates the Ethernet frame with the connection ID removed, in AAL5 format. Thereby, it converts the Ethernet frame with the connection ID removed into an AAL5 frame.

Next, the AAL5 generating unit 54C splits the AAL5 frame generated by the conversion into the payload size of ATM cell. Thereby, it converts the AAL5 frame into the payload of ATM cell.

Next, the AAL5 generating unit 54C temporarily stores the payload of ATM cell generated by the conversion in the cell buffer. It transmits a read request to the scheduler 55.

On receiving a read permission notice from the scheduler 55, the AAL5 generating unit 54C, to the start of the payload of one ATM cell stored in the cell buffer, adds a connection ID removed from an Ethernet frame converted into the payload of the ATM cell. It transmits the payload of ATM cell with the connection ID added to the scheduler 55.

The scheduler 55 receives a read request from at least one of the ATM bearer generating unit 54A, the AAL1 generating unit 54B, and the AAL5 generating unit 54C. Then, it determines a generating unit permitted to read data from among the ATM bearer generating unit 54A, the AAL1 generating unit 54B, and the AAL5 generating unit 54C that have transmitted the received read request. It transmits a read permission notice to the determined generating unit.

At this time, the scheduler 55 preferentially determines the AAL1 generating unit 54B as a generating unit permitted to read data. This is because AAL1 frames are used in communication that requires real time capability such as voice communication. Thereby, one ATM access network accommodated IF 31 can support three types of upper communication protocols the ATM bearer, AAL1, and AAL5 while minimizing processing delay of AAL1 frames.

After that, the scheduler 55 receives the payload of ATM cell from the generating unit to which the read permission notice is transmitted. The scheduler 55 transmits the received payload of ATM cell to the ATM header generating unit 56.

The ATM header generating unit 56 receives the payload of ATM cell from the scheduler 55. It consults the ATM header conversion table 57 to create an ATM header. It adds the generated ATM header to the received payload of ATM cell. Thereby, it creates an ATM cell. Processing of the ATM header generating unit 56 will be detailed in FIG. 14.

The ATM cell transmitting unit 58 receives an ATM cell from the ATM header generating unit 56. Then, it transmits the received ATM cell to the ATM access network 10.

The packet transfer apparatus 100 of this embodiment includes an ATM access network accommodated IF 31 constructed as described above. Thereby, a metro area network of a telecommunications carrier's network to which ATM protocol is applied can be replaced by a packet switching metro area network to which MPLS protocol is applied.

Figure 9:
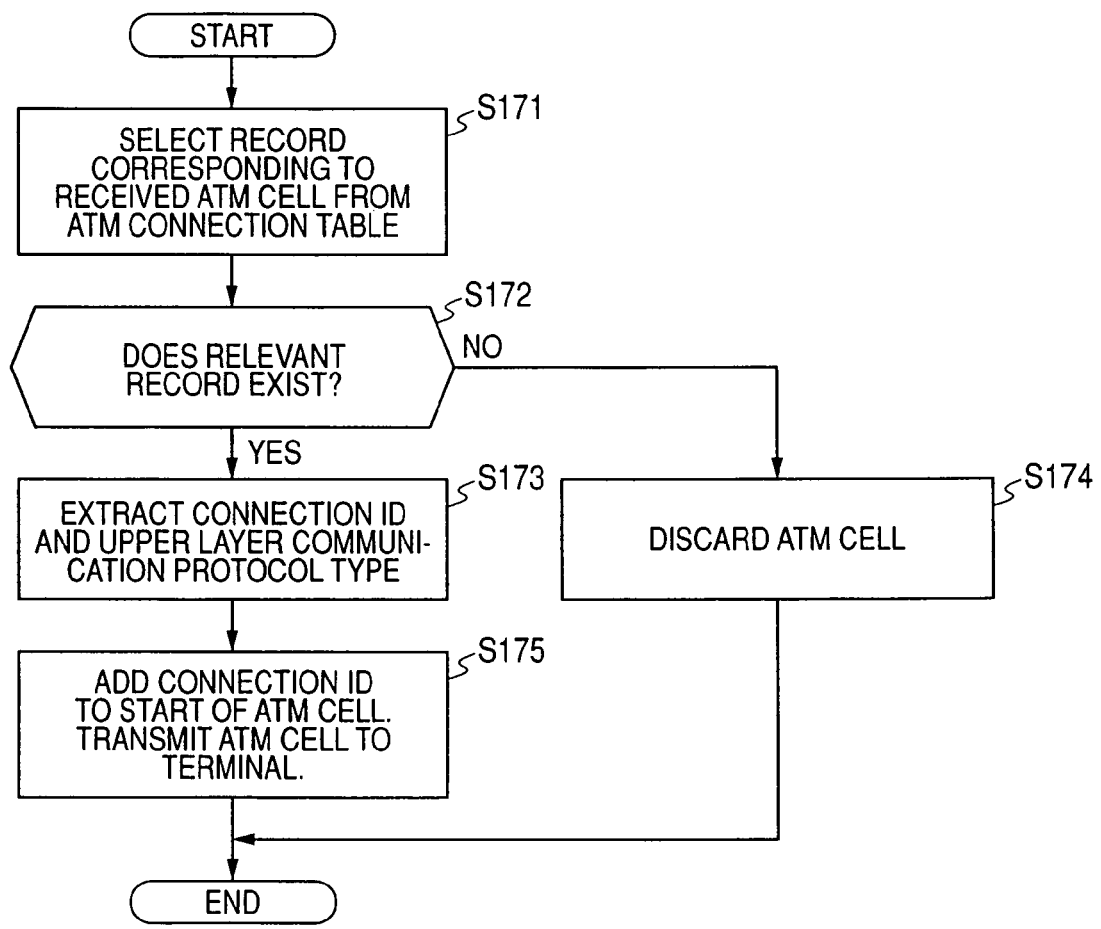
FIG. 9 is a flowchart of processing of a VPI/VCI connection check and allocation unit of an embodiment of the present invention.

FIG. 9 is a flowchart of processing of the VPI/VCI connection check and allocation unit 42 of an embodiment of the present invention.

The VPI/VCI connection check and allocation unit 42, when receiving an ATM cell from the ATM cell receiving unit 41, performs relevant processing.

First, the VPI/VCI connection check and allocation unit 42 selects a record corresponding to the received ATM cell from the ATM connection table 43 (S171).

Specifically, the VPI/VCI connection check and allocation unit 42 extracts VPI and VCI from the ATM header of the received ATM cell. Next, it selects a record that has VPI 61 of the ATM connection table 43 matching the extracted VPI and VCI 62 of the ATM connection table 43 matching the extracted VCI, from the ATM connection table 43.

Next, it determines whether a record corresponding to the received ATM cell has been selected from the ATM connection table 43 (S172).

When a record corresponding to the received ATM cell has not been selected, the VPI/VCI connection check and allocation unit 42 discards the received ATM cell (S175). It terminates the processing.

On the other hand, when a record corresponding to the received ATM cell has been selected, the VPI/VCI connection check and allocation unit 42 extracts a connection ID 63 and an upper layer communication protocol type 64 from the selected record (S173).

Next, the VPI/VCI connection check and allocation unit 42 adds the extracted connection ID 63 to the start of the received ATM cell.

Next, it determines a terminal corresponding to the extracted upper layer communication protocol type 64 from among the ATM bearer terminal 44A, the AAL1 terminal 44B, and the AAL5 terminal 44C.

For example, when the extracted upper layer communication protocol type 64 indicates "ATM bearer," the VPI/VCI connection check and allocation unit 42 determines the ATM bearer terminal 44A. When the extracted upper layer communication protocol type 64 indicates "AAL1," it determines the AAL1 terminal 44B. When the extracted upper layer communication protocol type 64 indicates "AAL5," it determines the AAL5 terminal 44C.

Next, the VPI/VCI connection check and allocation unit 42 transmits an ATM cell added with a connection ID 63 to the determined terminal (S174). Then, it terminates the processing.

As described above, the VPI/VCI connection check and allocation unit 42, based on the VPI and VCI of the received ATM cell, determines the transfer destination of the received ATM cell from among the ATM bearer terminal 44A, the AAL1 terminal 44B, and the AAL5 terminal 44C. Therefore, one ATM access network accommodated IF 31 can support three types of upper communication protocols the ATM bearer, AAL1, and AAL5.

Figure 10:
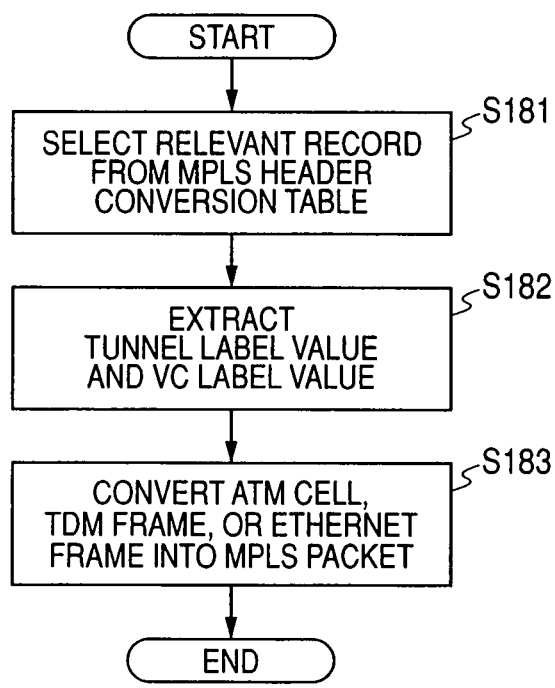
FIG. 10 is a flowchart of processing of an MPLS encapsulating unit of an embodiment of the present invention.

FIG. 10 is a flowchart of processing of the MPLS encapsulating unit 46 of an embodiment of the present invention.

On receiving an ATM cell, TDM frame or Ethernet frame from the scheduler 45, the MPLS encapsulating unit 46 performs relevant processing.

First, the MPLS encapsulating unit 46 extracts a connection ID from the received ATM cell, TDM frame or Ethernet frame. Next, it selects a record having a connection ID 65 matching the extracted connection ID from the MPLS header conversion table 47 (S181).

Next, it extracts a tunnel label value 66 and a VC label value 67 from the selected record (S182).

Next, it creates an MPLS label, based on the extracted tunnel label value 66. Next, it generates a VC MPLS label, based on the extracted VC label value 67.

Next, it encapsulates the received ATM cell, TDM frame, or Ethernet frame by the generated tunnel MPLS label and VC MPLS label (S183). The tunnel MPLS label and VC MPLS label are added to the start of the received ATM cell, TDM frame, or Ethernet frame so that the VC MPLS label is inside, and the tunnel MPLS label is outside.

Thereby, the MPLS encapsulating unit 46 converts the received ATM cell, TDM frame, or Ethernet frame into an MPLS packet (S183).

Next, it transmits the MPLS packet generated by the conversion to the switch packet transmitting unit 48. Then, it terminates the processing.

Thus, it determines an MPLS label, based on the connection ID added to the received TDM frame or Ethernet frame instead of information contained in the received TDM frame or Ethernet frame. The connection ID is uniquely decided by VPI and VCI contained in the ATM header of the ATM cell converted into the TDM frame or Ethernet frame. However, the connection ID may be uniquely determined from only VPI contained in the ATM header of the ATM cell instead of the VPI and VCI contained in the ATM header of the ATM cell.

Therefore, the ATM access network accommodated IF 31, unlike the metro accommodating apparatus 5B shown in FIG. 2, does not need to store a time slot-MPLS label correspondence table. The time slot-MPLS label correspondence table is a table for searching for an MPLS label for encapsulating a relevant TDM frame from the time slot of the TDM frame. Therefore, the time slot-MPLS label correspondence table shows the correspondence between the time slots of TDM frames and the identifiers of MPLS labels.

The ATM access network accommodated IF 31, unlike the metro accommodating apparatus 5C shown in FIG. 2, does not need to store a MAC address-MPLS label correspondence table. The MAC address-MPLS label correspondence table is a table for searching for an MPLS label for encapsulating an Ethernet frame from the destination MAC address of an Ethernet frame. Therefore, the MAC address-MPLS label correspondence table shows the correspondence between MAC addresses and the identifiers of MPLS labels.

A MAC address is an address allocated when a network interface card of the user terminal 3 is manufactured. Therefore, it is difficult for a manager of the packet switching metro area network 30 to create the MAC address-MPLS label correspondence table. Accordingly, the metro accommodating apparatus 5C automatically learns the correspondence between MAC addresses and MPLS labels by performing MAC automatic learning processing. Thereby, the metro accommodating apparatus 5C automatically creates the MAC address-MPLS label correspondence table. MAC automatic learning processing executed by the metro accommodating apparatus 5C will be detailed in FIG. 11.

The Metro accommodating apparatus 5C determines an MPLS label for encapsulating an Ethernet frame, based on the MAC address-MPLS label correspondence table. However, the metro accommodating apparatus 5C cannot determine an MPLS label, it must execute flooding processing. MPLS label determination processing executed by the metro accommodating apparatus 5C will be detailed in FIG. 12.

On the other hand, the ATM access network accommodated IF of this embodiment 31 determines an MPLS label, based on a connection ID added to a received Ethernet frame. Therefore, the ATM access network accommodated IF 31, unlike the metro accommodating apparatus 5C shown in FIG. 2, does not need to execute the MAC automatic learning processing. Moreover, the ATM access network accommodated IF 31, unlike the metro accommodating apparatus 5C shown in FIG. 2, does not need to execute flooding processing.

Figure 11:
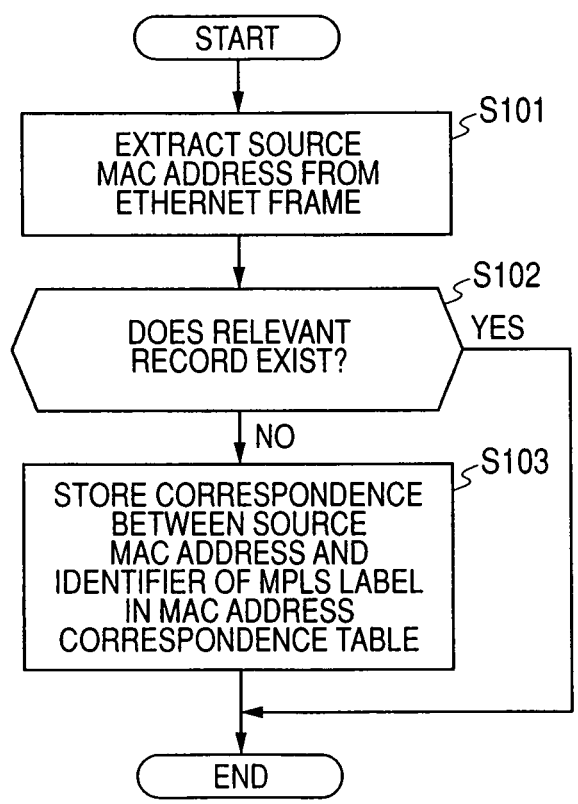
FIG. 11 is a flowchart of MAC automatic learning processing executed by a metro accommodating apparatus shown in FIG. 2.

FIG. 11 is a flowchart of MAC automatic learning processing executed by the metro accommodating apparatus 5C shown in FIG. 2.

On receiving an MPLS packet from the packet switching metro area network 30, the metro accommodating apparatus 5C executes pertinent MAC automatic learning processing.

First, the metro accommodating apparatus 5C decapsulates the received MPLS packet. Thereby, the metro accommodating apparatus 5C converts the received MPLS packet into an Ethernet frame.

Next, the metro accommodating apparatus 5C extracts a sender MAC address from the Ethernet frame generated by the conversion (S101). Next, the metro accommodating apparatus 5C determines whether a record having a MAC address matching the extracted sender MAC address exists in the MAC address-MPLS label correspondence table (S102).

When the relevant record exists in the MAC address-MPLS label correspondence table, the metro accommodating apparatus 5C immediately terminates the MAC automatic learning processing.

On the other hand, when a relevant record does not exist in the MAC address-MPLS label correspondence table, the metro accommodating apparatus 5C adds a new record to the MAC address-MPLS label correspondence table. Next, the metro accommodating apparatus 5C stores the correspondence between the extracted sender MAC address and the identifier of the MPLS label of the received MPLS packet in the new record (S103). Then, the metro accommodating apparatus 5C terminates the MAC automatic learning processing.

Figure 12:
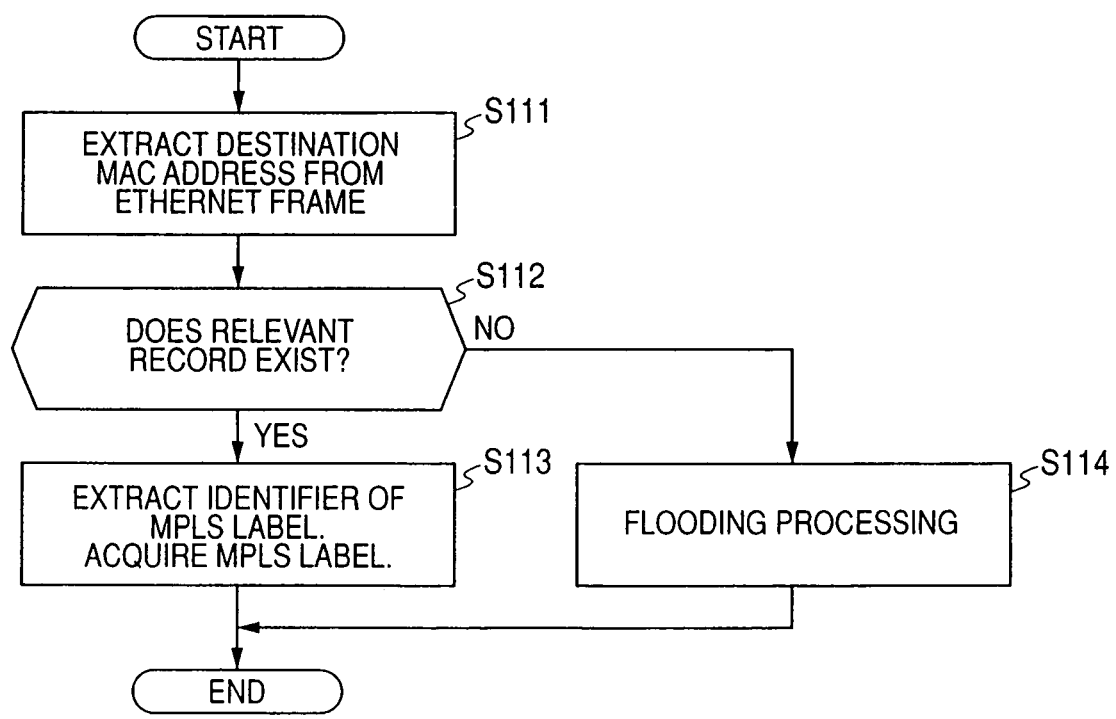
FIG. 12 is a flowchart of MPLS label determination processing executed by the metro accommodating apparatus shown in FIG. 2.

FIG. 12 is a flowchart of MPLS label determination processing executed by the metro accommodating apparatus 5C shown in FIG. 2.

On receiving an Ethernet frame the ATM access network 10, the metro accommodating apparatus 5C executes the relevant MPLS label determination processing.

First, the metro accommodating apparatus 5C extracts a destination MAC address from the received Ethernet frame (S111).

Next, the metro accommodating apparatus 5C determines whether a record having a MAC address matching the extracted destination MAC address exists in the MAC address-MPLS label correspondence table (S112).

When the relevant record exists in the MAC address-MPLS label correspondence table, the metro accommodating apparatus 5C extracts a record having a MAC address matching the extracted MAC address from the MAC address-MPLS label correspondence table. Next, the metro accommodating apparatus 5C extracts the identifier of MPLS label from the selected record. Next, the metro accommodating apparatus 5C acquires an MPLS label identified by the extracted identifier.

Next, the metro accommodating apparatus 5C encapsulates the received Ethernet frame with the acquired MPLS label. Thereby, the metro accommodating apparatus 5C converts the received Ethernet frame into an MPLS packet.

Next, the metro accommodating apparatus 5C transmits an MPLS packet generated by the conversion into an MPLS tunnel (S113). The metro accommodating apparatus 5C terminates the relevant MPLS label determination processing.

On the other hand, when a relevant record does not exist in the MAC address-MPLS label correspondence table, it performs flooding processing (S114).

Specifically, the metro accommodating apparatus 5C acquires all MPLS labels managed by the metro accommodating apparatus 5C. Next, it reproduces as many received Ethernet frames as there are all acquired MPLS labels.

Next, it encapsulates the reproduced Ethernet frames with each of the all acquired MPLS labels. Thereby, it converts each of the reproduced Ethernet frames into an MPLS packet having a different destination.

Next, it transmits the MPLS packet generated by the conversion to the MPLS tunnel. In short, the metro accommodating apparatus 5C transmits the MPLS packet to all destinations managed by it. Then, it terminates the MPLS label determination processing.

In the flooding processing, the metro accommodating apparatus 5C must reproduce plural Ethernet frames. Unnecessary MPLS packets will be transmitted to the packet switching metro area network 30. As a result, the metro accommodating apparatus 5C and the packet switching metro area network 30 have been heavily loaded.

On the other hand, unlike the metro accommodating apparatus 5C, since the ATM access network accommodated IF of this embodiment 31 does not need to execute flooding processing, loads can be reduced.

Figure 13:
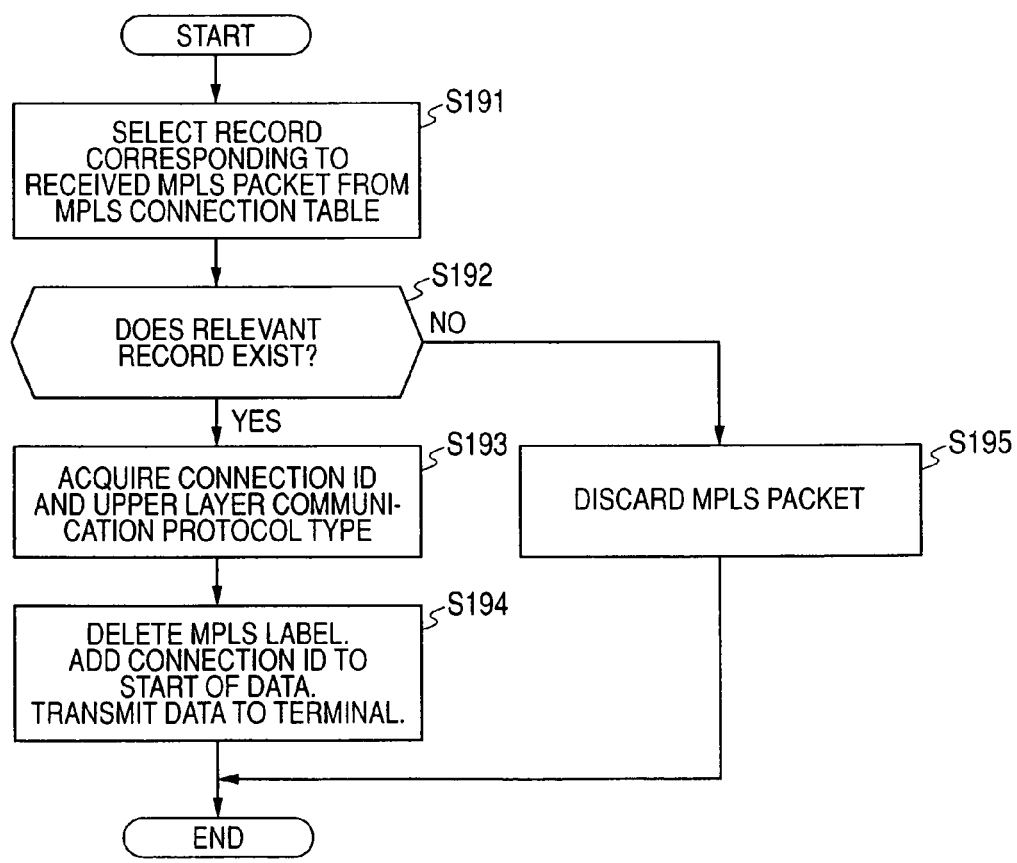
FIG. 13 is a flowchart of processing of an MPLS decapsulating and allocation unit of a first embodiment of the present invention.

FIG. 13 is a flowchart of processing of the MPLS decapsulating and allocation unit of the first embodiment of the present invention.

On receiving an MPLS packet from the switch packet receiving unit 51, the MPLS decapsulating and allocation unit 52 executes relevant processing.

First, the MPLS decapsulating and allocation unit 52 selects a record corresponding to a received MPLS packet from the MPLS connection table 53 (S191).

Specifically, it extracts a tunnel label value and a VC label value from the received MPLS packet. Next, it selects a record having a tunnel label value 71 matching the extracted tunnel label value and a VC label value 72 matching the extracted VC label value from the MPLS connection table 53.

Next, it determines whether a record corresponding to the received MPLS packet has been selected from the MPLS connection table 53 (S192).

When a record corresponding to the received MPLS packet has not been selected, it discards the received MPLS packet (S195).

On the other hand, when a record corresponding to the received MPLS packet has been selected, it extracts a connection ID 73 and an upper layer communication protocol type 74 from the selected record (S193).

Next, it deletes a tunnel label and a VC label from the received MPLS packet. Thereby, it converts the received MPLS packet into the payload of ATM cell, a TDM frame, or an Ethernet frame.

Next, it adds the extracted connection ID 73 to the start of the payload of ATM cell, the TDM frame, or the Ethernet frame that are generated by the conversion.

Next, it determines a generating unit corresponding to the extracted upper layer communication protocol type 74 from among the ATM bearer generating unit 54A, the AAL1 generating unit 54B, and the AAL5 generating unit 54C.

For example, when the extracted upper layer communication protocol type 74 indicates "ATM bearer," it determines the ATM bearer generating unit 54A. When the extracted upper layer communication protocol type 74 indicates "AAL1," it determines AAL1 generating unit 54B. When the extracted upper layer communication protocol type 74 indicates "AAL5," it determines AAL5 generating unit 54C.

Next, it transmits the payload of ATM cell, the TDM frame, or the Ethernet frame that are added with the connection ID 73 to a determined generating unit (S194).

For example, the MPLS decapsulating and allocation unit 52 transmits the payload of ATM cell added with the connection ID 73 to the determined ATM bearer generating unit 54A.

Moreover, it transmits a TDM frame added with the connection ID 73 to the determined AAL1 generating unit 54B. It transmits an Ethernet frame added with the connection ID 73 to the determined AAL5 generating unit 54C.

Then, it terminates the processing.

Thus, the MPLS decapsulating and allocation unit 52 determines an upper layer communication protocol type of the received MPLS packet, based on the tunnel label value and the VC label value of the received MPLS packet. Therefore, one ATM access network accommodated IF can support three types of upper communication protocols the ATM bearer, AAL1, and AAL5.

Figure 14:
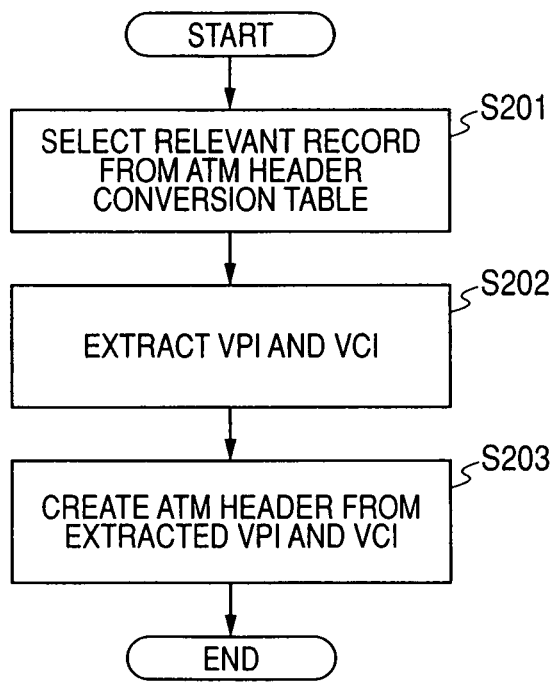
FIG. 14 is a flowchart of processing of an ATM header generating unit of an embodiment of the present invention.

FIG. 14 is a flowchart of processing of the ATM header generating unit 56 of the embodiment of the present invention.

On receiving the payload of ATM cell from the scheduler 55, the ATM header generating unit 56 executes relevant processing.

First, it extracts a connection ID from the received payload of ATM cell. Next, it selects a record having a connection ID 75 matching the extracted connection ID from the ATM header conversion table 57 (S201).

Next, it extracts VPI 76 and VCI 77 from the selected record (S202).

Next, it creates an ATM header by storing the extracted VPI and VCI in the ATM header (S203). Next, it adds the created ATM header to the received payload of ATM cell. Thereby, the ATM header generating unit 56 generates an ATM cell.

Next, it transmits the generated ATM cell to ATM cell transmitting unit 58. Then, it terminates the relevant processing.

Thus, the ATM header generating unit 56 determines the VPI and VCI of the ATM header, based on the connection ID instead of information contained in the TDM frame or Ethernet frame. The connection ID is uniquely determined by the tunnel label and the VC label of an MPLS packet converted into the TDM frame or Ethernet frame. However, the connection ID may be uniquely determined by only the tunnel label of the MPLS packet instead of the tunnel label and the VC label of the MPLS packet.

Therefore, the ATM access network accommodated IF 31, unlike the AAL1 accommodating apparatus 4B2 shown in FIG. 2, does not store a time slot-ATM header information correspondence table. The time slot-ATM header information correspondence table is a table searching for ATM header information containing VPI and VCI from time slot of TDM frame. Therefore, the time slot-ATM header information correspondence table shows the correspondence between time slots of TDM frame and ATM header information.

The ATM access network accommodated IF 31, unlike the AAL5 accommodating apparatus 4C2 shown in FIG. 2, does not need to store the MAC address-ATM header information correspondence table. The MAC address-ATM header information correspondence table is a table for searching for the ATM header information from a destination MAC address of Ethernet frame. Therefore, the MAC address-ATM header information correspondence table shows the correspondence between MAC address and ATM header information.

The ATM access network accommodated IF of this embodiment 31 determines ATM header information based on a connection ID. Therefore, the ATM access network accommodated IF 31, unlike the metro accommodating apparatus 5C shown in FIG. 2, does not execute MAC automatic learning processing. Moreover, the ATM access network accommodated IF 31, unlike the metro accommodating apparatus 5C shown in FIG. 2, does not execute flooding processing.

Figure 15:
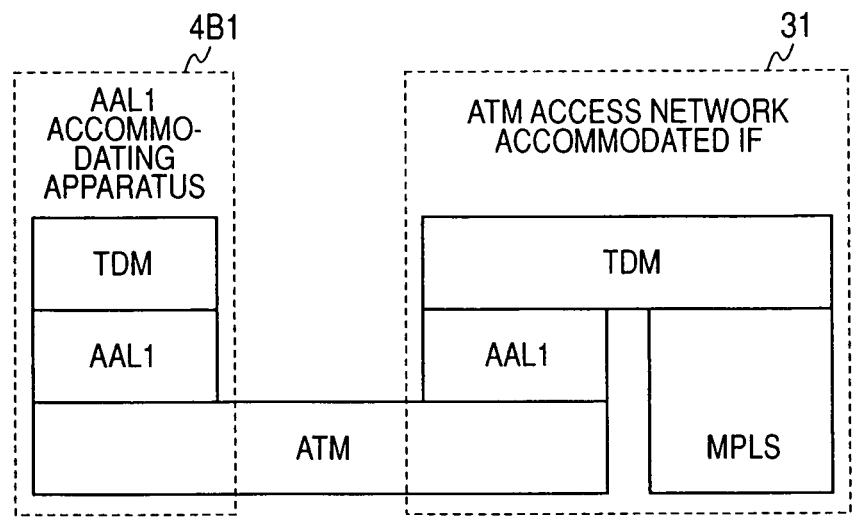
FIG. 15 is an explanatory drawing of protocol stack of communication concerning TDM frame of an embodiment of the present invention.

FIG. 15 is an explanatory drawing of protocol stack of communication concerning TDM frame of the embodiment of the present invention.

On receiving a TDM frame from the user terminal 2, the AAL1 accommodating apparatus 4B1 encapsulates the TDM frame received from the user terminal 2 with the AAL1 format. Thereby, the AAL1 accommodating apparatus 4B1 converts the received TDM frame into an AAL1 frame.

Next, the AAL1 accommodating apparatus 4B1 splits, the AAL1 frame generated by the conversion into ATM cell size, and adds an ATM header. Thereby, the AAL1 accommodating apparatus 4B1 converts the AAL1 frame into an ATM cell. Then, it transmits the ATM cell generated by the conversion to the ATM access network 10.

On receiving the ATM cell from the ATM access network 10, the ATM access network accommodated IF 31 of the packet transfer apparatus 100 converts the received one or more ATM cells into an AAL1 frame. Next, it decapsulates the AAL1 frame generated by the conversion. Thereby, the ATM access network accommodated IF 31 converts the AAL1 frame into a TDM frame.

Moreover, the ATM access network accommodated IF 31 determines an MPLS label, based on the ATM header information of the received ATM cell. Then, it encapsulates the TDM frame generated by the conversion with the determined MPLS label. Thereby, it converts the TDM frame into an MPLS packet.

The ATM access network accommodated IF 31 transmits the MPLS packet generated by the conversion to the packet switching metro area network 30 via the switch 32 and the MPLS metro IF 9A.

The following describes communication concerning a TDM frame in an opposite direction.

The ATM access network accommodated IF 31 receives an MPLS packet from the packet switching metro area network 30 via the switch 32 and the MPLS metro IF 9A. Then, it determines an ATM header, based on the MPLS label of the received MPLS packet.

Next, it decapsulates the received MPLS packet. Thereby, it converts the MPLS packet into the TDM frame.

Next, it encapsulates the TDM frame generated by the conversion with the AAL1 format. Thereby, it converts the TDM frame into an AAL1 frame.

Next, it splits the AAL1 frame generated by the conversion into the payload size of ATM cell. Thereby, it converts the AAL1 frame into the payload of ATM cell.

Next, it adds the determined ATM header to the payload of ATM cell generated by the conversion. Thereby, it creates an ATM cell. Then, it transmits the created ATM cell to the ATM access network 10.

The AAL1 accommodating apparatus 4B1 receives an ATM cell from the ATM access network 10. It converts the received one or more ATM cells into an AAL1 frame. Next, it decapsulates the AAL1 frame generated by the conversion. Thereby, it converts the AAL1 frame into a TDM frame.

The AAL1 accommodating apparatus 4B1 transmits the TDM frame generated by the conversion to the user terminal 2.

Figure 16:
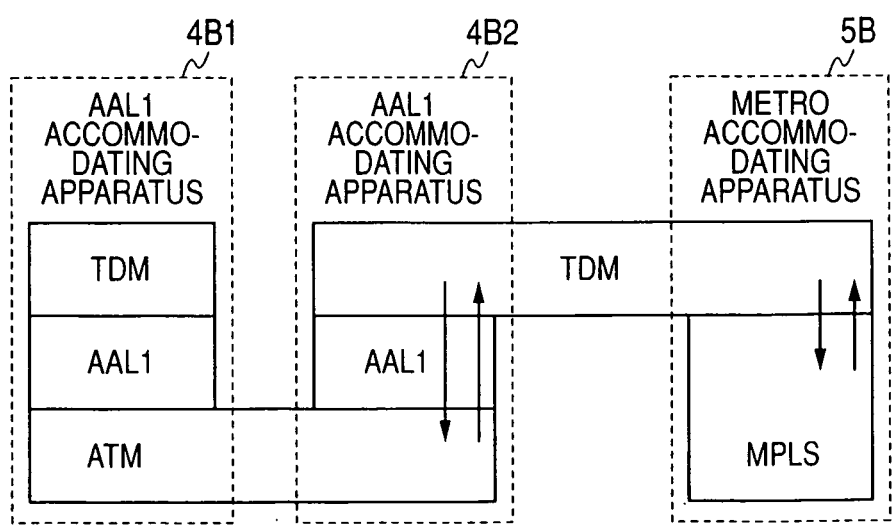
FIG. 16 is an explanatory drawing of protocol stack of communication concerning TDM frame in a telecommunications carrier's network constructed as shown in FIG. 2.

FIG. 16 is an explanatory drawing of protocol stack of communication concerning TDM frame in a telecommunications carrier's network constructed as shown in FIG. 2.

On receiving a TDM frame from the user terminal 2, the AAL1 accommodating apparatus 4B1 encapsulates the TDM frame with the AAL1 format. Thereby, the AAL1 accommodating apparatus 4B1 converts the received TDM frame into an AAL1 frame.

Next, it splits the AAL1 frame generated by the conversion into ATM cell size, and adds an ATM header. Thereby, it converts the AAL1 frame into an ATM cell. Then, it transmits the ATM cell generated by the conversion to the ATM access network 10.

On receiving an ATM cell from the ATM access network 10, the AAL1 accommodating apparatus 4B2 converts the received one or more ATM cells into an AAL1 frame. Next, it decapsulates the AAL1 frame generated by the conversion. Thereby, it converts the AAL1 frame into a TDM frame. Then, it transmits the TDM frame generated by the conversion to the metro accommodating apparatus 5B.

On receiving the TDM frame from the AAL1 accommodating apparatus 4B2, the metro accommodating apparatus 5B determines an MPLS label, based on the time slot of the received TDM frame. Next, it encapsulates the received TDM frame with the determined MPLS label. Thereby, the ATM access network accommodated IF 31 converts the received TDM frame into an MPLS packet.

The metro accommodating apparatus 5B transmits the MPLS packet generated by the conversion to the packet switching metro area network 30.

Thus, the metro accommodating apparatus 5B determines an MPLS label, based on the time slot of the received TDM frame. Therefore, it must have to store a time slot-MPLS label correspondence table showing the correspondence between the time slots of TDM frames and the identifiers of MPLS labels.

On the other hand, the ATM access network accommodated IF of this embodiment 31 determines an MPLS label, based on the ATM header information of a received ATM cell. Therefore, the ATM access network accommodated IF 31 does not need to store time slot MPLS label correspondence table.

The following describes communication concerning a TDM frame in an opposite direction.

On receiving an MPLS packet from the packet switching metro area network 30, the metro accommodating apparatus 5B decapsulates the received MPLS packet. Thereby, the metro accommodating apparatus 5B converts the MPLS packet into a TDM frame.

Next, it transmits the TDM frame generated by the conversion to the AAL1 accommodating apparatus 4B2.

On receiving the TDM frame from the metro accommodating apparatus 5B, the AAL1 accommodating apparatus 4B2 determines an ATM header, based on the time slot, of the received TDM frame. Next, it encapsulates the received TDM frame with the AAL1 format. Thereby, the AAL1 accommodating apparatus 4B2 converts the received TDM frame into an AAL1 frame.

Next, it splits the AAL1 frame generated by the conversion into the payload size of ATM cell. Thereby, it converts the AAL1 frame into the payload of ATM cell.

Next, it adds the determined ATM header to the payload of ATM cell generated by the conversion. Thereby, it creates an ATM cell. Then, it transmits the created ATM cell to the ATM access network 10.

The AAL1 accommodating apparatus 4B1 receives an ATM cell from the ATM access network. Next, it converts the received one or more ATM cells into an AAL1 frame. Next, it decapsulates the AAL1 frame generated by the conversion. Thereby, it converts the AAL1 frame into a TDM frame.

It transmits the TDM frame generated by the conversion to the user terminal 2.

Thus, the AAL1 accommodating apparatus 4B2 determines the ATM header, based on the time slot of the received TDM frame. Therefore, it must have to store a time slot-ATM header information correspondence table indicating the correspondence between the time shots of TDM frames and ATM header information.

On the other hand, the ATM access network accommodated IF of this embodiment 31 determines an ATM header, based on the tunnel label and the VC label of a received MPLS packet. Therefore, the ATM access network accommodated IF 31 does not need to store the time slot-ATM header information correspondence table.

Figure 17:
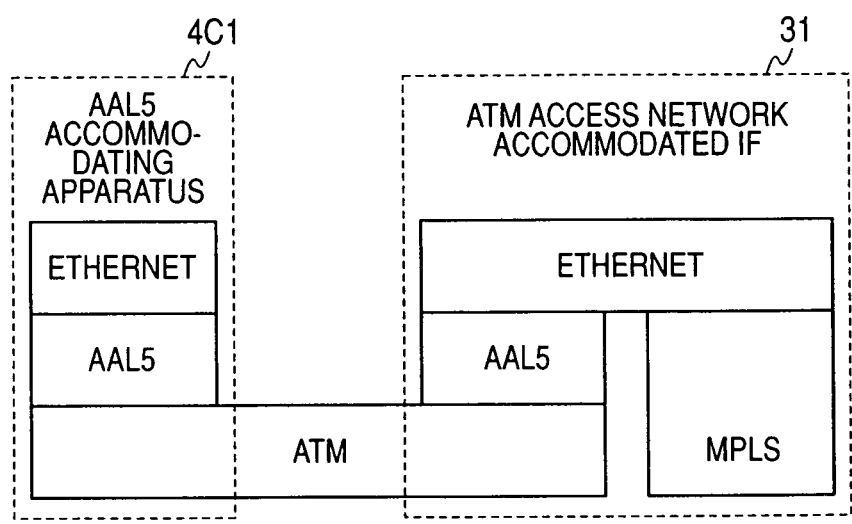
FIG. 17 is an explanatory drawing of protocol stack of communication concerning Ethernet frame of an embodiment of the present invention.
Figure 18:
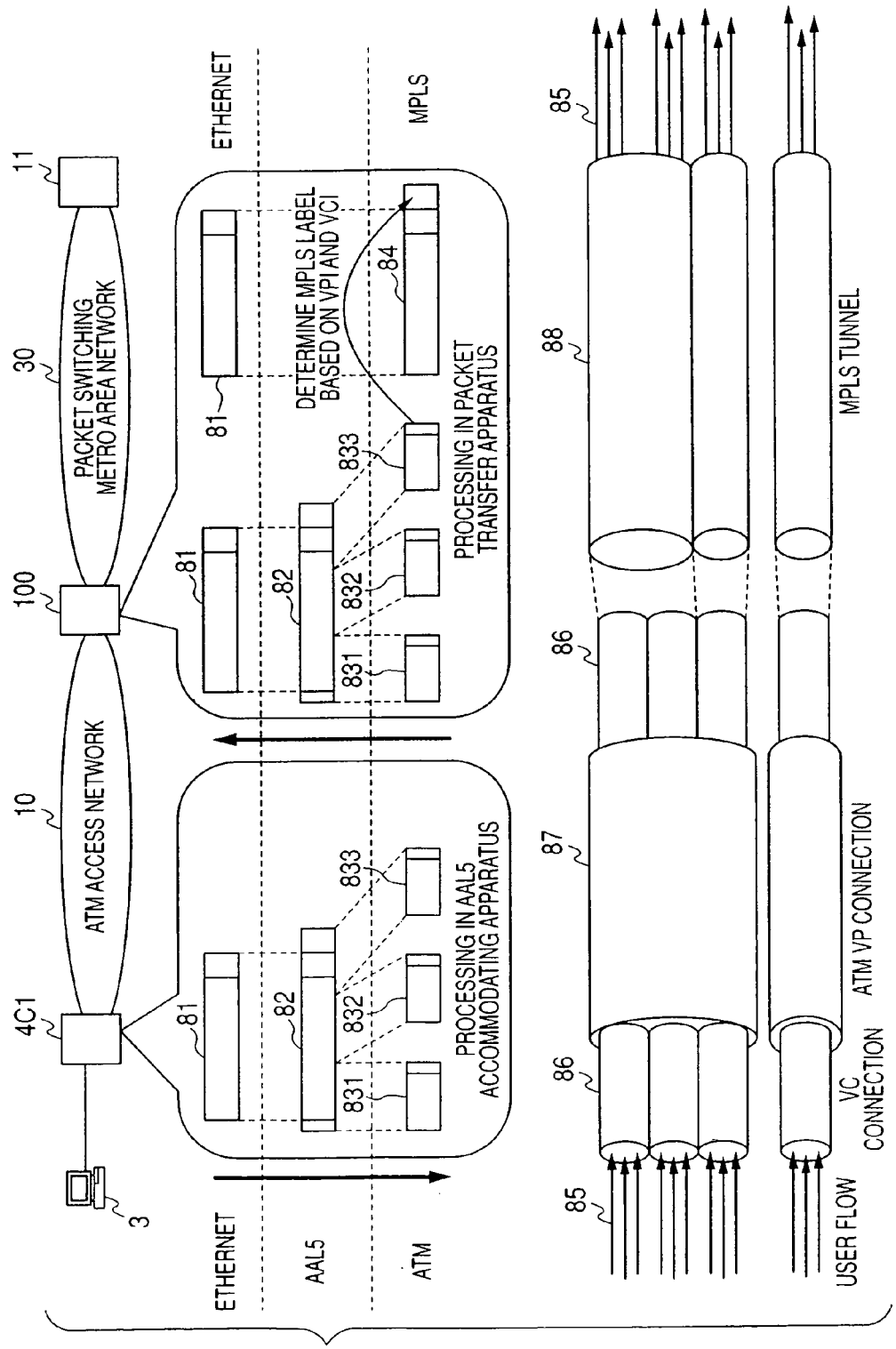
FIG. 18 is an explanatory drawing of communication concerning Ethernet frame of an embodiment of the present invention.

FIG. 17 is an explanatory drawing of protocol stack of communication concerning Ethernet frame of the embodiment of the present invention. FIG. 18 is an explanatory drawing of communication concerning Ethernet frame of the embodiment of the present invention.

On receiving an Ethernet frame 81 from the user terminal 3, the AAL5 accommodating apparatus 4C1 encapsulates the Ethernet frame 81 received from the user terminal 3 with the AAL5 format. Thereby, it converts the received Ethernet frame 81 into an AAL5 frame 82.

Next, it splits the AAL5 frame 82 generated by the conversion into ATM cell size, and adds an ATM header. Thereby, it converts the AAL5 frame 82 into ATM cells 831, 832, and 833. Then, the AAL5 accommodating apparatus 4C1 transmits the ATM cells 831, 832, and 833 generated by the conversion to the ATM access network 10.

The Ethernet frame 81 transmitted from the user terminal 3 is classified into a user flow 85 according to a combination of a sender MAC address and a destination MAC address. The user flow 85 is associated with VC (Virtual Channel) connection 86 in the AAL5 accommodating apparatus 4C1. The VC connection 86 is a minimum unit of the ATM connection. For example, one VC connection 86 is associated with one or more user flows 85 that are inputted from an identical physical port and have an identical destination. Furthermore, the VC connection 86 is associated with VP (Virtual Path) connection 87. The destination of an ATM cell is determined by these associations.

On receiving ATM cells 831, 832, and 833 from the ATM access network 10, the ATM access network accommodated IF 31 of the packet transfer apparatus 100 converts the received ATM cells 831, 832 and 833 into an AAL5 frame 82. Next, it decapsulates the AAL5 frame 82 generated by the conversion. Thereby, it converts the AAL5 frame 82 into an Ethernet frame 81.

Moreover, the ATM access network accommodated IF 31 determines an MPLS label, based on the ATM header information of the received ATM cells 831, 832, and 833. Then, it encapsulates an Ethernet frame 81 generated by the conversion with the determined MPLS label. Thereby, it converts the Ethernet frame 81 into an MPLS packet 84.

Then, it transmits the MPLS packet 84 generated by the conversion to the packet switching metro area network 30 via the switch 32 and the MPLS metro IF 9A.

The following describes communication concerning Ethernet frame in an opposite direction.

The ATM access network accommodated IF 31 receives an MPLS packet 84 from the packet switching metro area network 30 via the switch 32 and the MPLS metro IF 9A. Then, it determines an ATM header, based on the MPLS label of the received MPLS packet 84.

Next, it decapsulates the received MPLS packet 84. Thereby, it converts the MPLS packet 84 into an Ethernet frame 81.

Next, it encapsulates the Ethernet frame 81 generated by the conversion with the AAL5 format. Thereby, it converts the Ethernet frame 81 into an AAL5 frame 82.

Next, it splits the AAL5 frame 82 generated by the conversion into the payload size of ATM cell. Thereby, it converts the AAL5 frame into the payload of ATM cell.

Next, it adds the determined ATM header to the payload of ATM cell generated by the conversion. Thereby, it creates ATM cells 831, 832, and 833. Then, it transmits the created ATM cells 831, 832, and 833 to the ATM access network 10.

On receiving the ATM cells 831, 832, and 833 from the ATM access network 10, the AAL5 accommodating apparatus 4C1 converts the received ATM cells 831; 832, and 833 into an AAL5 frame 82. Next, it decapsulates the AAL5 frame 82 generated by the conversion. Thereby, it converts the AAL5 frame 82 into an Ethernet frame 81.

Then, it transmits the Ethernet frame 81 generated by the conversion to the user terminal 3.

Figure 19:
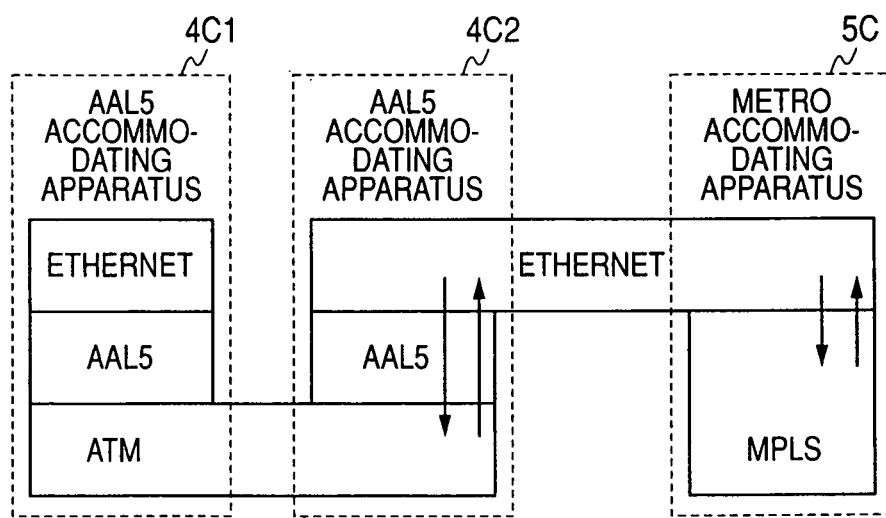
FIG. 19 is an explanatory drawing of protocol stack of communication concerning Ethernet frame in a telecommunications carrier's network constructed as shown in FIG. 2.

FIG. 19 is an explanatory drawing of protocol stack of communication concerning Ethernet frame in the telecommunications carrier's network constructed as shown in FIG. 2. FIG. 20 is an explanatory drawing of communication concerning Ethernet frame in the telecommunications carrier's network constructed as shown in FIG. 2.

On receiving an Ethernet frame 21 from the user terminal 3, the AAL5 accommodating apparatus 4C1 encapsulates the Ethernet frame 21 received from the user terminal 3 with the AAL5 format. Thereby, it converts the received Ethernet frame 21 into an AAL5 frame 22.

Next, it splits the AAL5 frame 22 generated by the conversion into ATM cell size, and adds an ATM header. Thereby, it converts the AAL5 frame 22 into ATM cells 231, 232, and 233. Then, it transmits the ATM cells 231, 232, and 233 generated by the conversion to the ATM access network 10.

The Ethernet frame 81 transmitted from the user terminal 3 is classified into a user flow 25 according to a combination of a sender MAC address and a destination MAC address. The user flow 25 is associated with a VC connection 26 in the AAL5 accommodating apparatus 4C1. The VC connection 26 is a minimum unit of ATM connection. For example, one VC connection is associated with one or more user flows 25 that are inputted from an identical physical port and have an identical destination. Furthermore, the VC connection 26 is associated with VP (Virtual Path) connection 27. The destination of an ATM cell is determined by these associations.

On receiving ATM cells 231, 232, and 233 from the ATM access network 10, the AAL5 accommodating apparatus 4C2 converts the received ATM cells 231, 232, and 233 into an AAL5 frame 22. Next, it decapsulates the AAL5 frame 22 generated by the conversion. Thereby, the AAL1 accommodating apparatus 4B2 converts the AAL5 frame 22 into an Ethernet frame 21. Then, the AAL5 accommodating apparatus 4C2 transmits the Ethernet frame 21 generated by the conversion to the metro accommodating apparatus 5C.

On receiving the Ethernet frame 21 from the AAL1 accommodating apparatus 4B2, the metro accommodating apparatus 5C determines an MPLS label, based on the destination MAC address of the received Ethernet frame 21. Next, it encapsulates the received Ethernet frame 21 with the determined MPLS label. Thereby, the ATM access network accommodated IF 31 converts the received Ethernet frame 21 into an MPLS packet 24.

The metro accommodating apparatus 5C transmits the MPLS packet 24 generated by the conversion to the packet switching metro area network 30.

Thus, the metro accommodating apparatus 5C determines the MPLS label, based on the destination MAC address of the received Ethernet frame. Therefore, it must store a MAC address-MPLS label correspondence table showing correspondence between the destination MAC addresses of Ethernet frames and the identifiers of MPLS labels.

On the other hand, the ATM access network accommodated IF 31 of this embodiment determines the MPLS label, based on the ATM header information of received ATM cell. Therefore, it does not need to store the MAC address-MPLS label correspondence table. Accordingly, it does not need to execute the MAC learning processing.

The ATM access network accommodated IF 31 does not need to select a different MPLS label for each user flow. Therefore, it does not need to determine a user flow, based on the MAC address and the like of Ethernet frame. Furthermore, a change in the number of user flows exerts no influence on the ATM access network accommodated IF 31.

The following describes communication concerning Ethernet frame in an opposite direction.

On receiving an MPLS packet 24 from the packet switching metro area network 30, the metro accommodating apparatus 5C decapsulates the received MPLS packet 24. Thereby, it converts the MPLS packet 24 into an Ethernet frame 21.

Next, it transmits the Ethernet frame 21 generated by the conversion to the AAL5 accommodating apparatus 4C2.

On receiving the Ethernet frame 21 from the metro accommodating apparatus 5C, the AAL5 accommodating apparatus 4C2 determines an ATM header, based on the destination MAC address of the received Ethernet frame 21.

Next, it encapsulates the received Ethernet frame 21 with the AAL5 format. Thereby, it converts the received Ethernet frame 21 into an AAL5 frame 22.

Next, it splits the AAL5 frame 22 generated by the conversion into the payload size of ATM cell. Thereby, it converts the AAL5 frame into the payload of ATM cell.

Next, it adds the determined ATM header to the payload of ATM cell generated by the conversion. Thereby, it creates ATM cells 231, 232, and 233. Then, it transmits the created ATM cells 231, 232, and 233 to the ATM access network 10.

The AAL5 accommodating apparatus 4C1 receives ATM cells 231, 232, and 233 from the ATM access network 10. Next, it converts the received ATM cells 231, 232, and 233 into an AAL5 frame 22. Next, it decapsulates the AAL5 frame 22 generated by the conversion. Thereby, it converts the AAL5 frame 22 into an Ethernet frame 21.

Then, it transmits the Ethernet frame 21 generated by the conversion to the user terminal 3.

Thus, the AAL5 accommodating apparatus 4C2 determines an ATM header, based on the destination MAC address of the received Ethernet frame. Therefore, it must store the MAC address-ATM header information correspondence table showing the correspondence between the destination MAC addresses of Ethernet frames and ATM header information.

On the other hand, the ATM access network accommodated IF 31 of this embodiment determines an ATM header, based on the tunnel label and VC label of a received MPLS packet. Therefore, it does not need to store the MAC address-ATM header information correspondence table.

What is claimed is:

1. A packet transfer apparatus connected to a first communication network over which data communication is performed with a first communication protocol, and a second communication network over which data communication is performed with a second communication protocol, the packet transfer apparatus comprising:
   a receiving unit that receives a packet of the first communication protocol generated by conversion of a packet of a third communication protocol from the first communication network,
   a processing unit that
   converts the received packet of the first communication protocol to a packet of the third communication protocol with terminating the first communication protocol, and
   converts the packet of the third communication protocol generated by the conversion with terminating the first communication protocol, into a packet of the second communication protocol by adding a header of the packet of the second communication protocol which is generated based on destination information of the received packet of the second communication protocol corresponding to destination information of a header of the received packet of the first communication protocol to the packet of the third communication protocol generated by the conversion with terminating the first communication protocol, and
   a transmitting unit that transmits the packet of the second communication protocol generated by the conversion to the second communication network.

2. A packet transfer apparatus according to claim 1, further comprising;
   storing a first destination correspondence information containing the correspondence between the destination information of the packet of the first communication protocol and the destination information of the packet of the second communication protocol,
   identifying an identification to identify the destination information of the second communication protocol packet corresponding to the destination information of the received first communication protocol packet,
   adding the identified identification to the generated third communication protocol packet by converting, and
   generating a header of the second communication protocol packet including the destination information of the second communication protocol based on the added identification.

3. A packet transfer apparatus according to claim 1, further comprising;
   converting the received first communication protocol packet to a packet of the specified third communication protocol based on a type of upper communication protocol identified by the destination information of the received first communication protocol packet.

4. A packet transfer apparatus according to claim 3, further comprising;
   storing a second destination correspondence information containing the correspondence between the destination information of the packet of the first communication protocol and the type of upper communication protocol, and
   converting the received first communication protocol packet to the packet of the specified third communication protocol based on the second destination correspondence information.

5. A packet transfer apparatus according to claim 1, further comprising;
   generating a third communication protocol packet using a plurality of the first communication protocol packet.

6. A packet transfer apparatus according to claim 3,
   wherein the upper communication protocol is AAL1, AAL5, and ATM bearer and
   wherein the packet transfer apparatus reads out preferentially the third communication protocol packet whose upper communication protocol is AAL1.

* * * * *